(12) United States Patent
Zariello

(10) Patent No.: US 12,481,069 B2
(45) Date of Patent: Nov. 25, 2025

(54) SYSTEM AND METHODS FOR CONTEMPORANEOUS MEASUREMENT AND SECURE TRANSMISSION OF PHYSICAL PROPERTY DATA

(71) Applicant: Patriot Creek Marine Concepts, Inc., Somerville, MA (US)

(72) Inventor: Joseph Zariello, Somerville, MA (US)

(73) Assignee: Patriot Creek Marine Concepts, Inc., Somerville, MA (US)

( * ) Notice: Subject to any disclaimer, the term of this patent is extended or adjusted under 35 U.S.C. 154(b) by 0 days.

(21) Appl. No.: 19/169,966

(22) Filed: Apr. 3, 2025

(65) Prior Publication Data

US 2025/0314780 A1    Oct. 9, 2025

Related U.S. Application Data

(60) Provisional application No. 63/574,250, filed on Apr. 3, 2024.

(51) Int. Cl.
  *G01S 19/14* (2010.01)
  *G01K 13/10* (2006.01)
  *G06Q 10/0832* (2023.01)

(52) U.S. Cl.
  CPC .............. *G01S 19/14* (2013.01); *G01K 13/10* (2013.01); *G06Q 10/0832* (2013.01)

(58) Field of Classification Search
  None
  See application file for complete search history.

(56) References Cited

U.S. PATENT DOCUMENTS

| 10,848,934 | B1 * | 11/2020 | Catalena | ............... H04W 48/10 |
| 2007/0171957 | A1 * | 7/2007 | Harris | ...................... G01K 1/02 |
| | | | | 374/E1.002 |

(Continued)

FOREIGN PATENT DOCUMENTS

| KR | 10-0926577 B1 | 11/2009 |
| KR | 10-2423066 B1 | 7/2022 |

(Continued)

OTHER PUBLICATIONS

Written Opinion of the International Searching Authority in relation to International Application No. PCT/US2025/023062, dated Jul. 24, 2025, 5 pages.

*Primary Examiner* — Adolf Dsouza
(74) *Attorney, Agent, or Firm* — Taylor Dykema PLLC; Eric Kleinertz

(57) ABSTRACT

A system for measuring and transmitting data comprising: an automated physical property data collector including: a collector battery, a collector microcontroller, and one or more collector sensors; one or more wireless networks; and an external database in wireless communication with the automated physical property data collector via the one or more wireless networks; the collector microcontroller having stored therein machine executable instructions, that when executed by the collector microcontroller, cause the automated physical property data collector to: collect, via the one or more collector sensors, physical property data from a product; and transmit, over the one or more wireless networks, the physical property data from the automated physical property data collector to the external database, the physical property data being stored in the external database and made accessible to a user via one or more client devices.

13 Claims, 16 Drawing Sheets

(56) References Cited

U.S. PATENT DOCUMENTS

| | | | | |
|---|---|---|---|---|
| 2018/0197393 A1* | 7/2018 | Gallo | ................... | G08B 25/10 |
| 2019/0073518 A1* | 3/2019 | Rao | ................... | H04B 10/1143 |
| 2020/0068368 A1* | 2/2020 | Kruse | ................... | H04L 67/10 |
| 2020/0265288 A1* | 8/2020 | Volkerink | ............... | H04W 4/33 |
| 2025/0055785 A1* | 2/2025 | Stubbs | ................... | H04L 45/02 |

FOREIGN PATENT DOCUMENTS

| | | |
|---|---|---|
| KR | 10-2022-0162995 A | 12/2022 |
| KR | 10-2024-0022765 A | 2/2024 |
| WO | 2022-056018 A1 | 3/2022 |

\* cited by examiner

SYSTEM AND METHODS FOR CONTEMPORANEOUS MEASUREMENT AND SECURE TRANSMISSION OF PHYSICAL PROPERTY DATA

CROSS REFERENCE TO RELATED APPLICATIONS

The present application claims the benefit of U.S. Patent Application No. 63/574,250 for SYSTEM AND METHODS FOR CONTEMPORANEOUS MEASUREMENT AND SECURE TRANSMISSION OF PHYSICAL PROPERTY DATA, filed Apr. 3, 2024, the entire contents of which are incorporated herein by reference.

FIELD OF THE DISCLOSURE

The present disclosure is directed to systems and methods for contemporaneous measurement and secure transmission of physical property data of perishable items. More specifically, the present disclosure is directed to systems and methods for contemporaneous measurement of physical properties for perishable items during shipment of said items through the supply chain.

INTRODUCTION

The global seafood industry has experienced a remarkable surge in demand as consumers worldwide develop an affinity for diverse aquatic offerings. Meeting this demand requires careful oversight of the entire supply chain—from the moment fish are caught to the point they arrive at the consumer's table. Factors such as temperature control, handling procedures, and packaging methods critically affect a fish's freshness, which in turn influences both its flavor and nutritional value. Suppliers who successfully uphold high freshness standards enjoy a competitive advantage, as satisfied customers tend to become repeat buyers and bolster the supplier's market reputation.

Despite advances in specialized packaging, insulated containers, and real-time temperature-monitoring systems, the industry remains vulnerable to Illegal, Unreported, and Unregulated (IUU) fishing practices and other forms of data manipulation. Unscrupulous entities may falsify shipping records, exaggerate freshness, or mislabel subpar products to command premium prices under false pretenses. These deceptive tactics undermine consumer trust and stifle fair competition, while also enabling illegally harvested goods to blend seamlessly into legitimate markets.

Modern consumers increasingly demand full transparency into "who, what, when, and where" regarding their seafood, placing freshness, safety, and sustainability at the forefront of purchasing decisions. Their concerns extend to the potential health risks of improperly handled fish and the ecological damage caused by IUU fishing. However, current methods of verifying product quality and provenance often rely on data that can be easily altered or obscured.

However, current technological solutions for ensuring freshness are susceptible to manipulation, thus allowing unscrupulous fish suppliers to alter data, which ultimately may skew said data to portray products as fresher than they truly are. Engaging in such dishonest practices harms the consumer by delivering substandard products at inflated costs.

Accordingly, there is a clear need for robust, tamper-resistant systems and methods to monitor fish freshness, while ensuring that data cannot be manipulated at any stage of the supply chain. These same principles and technologies can also be adapted to a broad range of commodities—such as produce, meat, minerals, and fuel—where accurate and transparent tracking from source to final destination is integral to consumer confidence, market integrity, and resource sustainability.

SUMMARY

This Summary is provided to introduce a selection of concepts in a simplified form that are further described below in the Detailed Description. This Summary is not intended to identify key features or essential features, nor is it intended to limit the scope of the claims included herewith.

Aspects of the present disclosure may relate to a system for contemporaneously measuring and securely transmitting product physical property data. In an embodiment, the system may be comprised of: an automated physical property data collector which may include: a collector battery, a collector microcontroller in electrical communication with the collector battery, and one or more collector sensors in electrical communication with the collector battery and communicatively coupled to the collector microcontroller; one or more wireless networks; and an external database in wireless communication with the automated physical property data collector via the one or more wireless networks. Furthermore, the collector microcontroller may have stored therein machine executable instructions, that when executed by the collector microcontroller, cause the automated physical property data collector to: collect, via the one or more collector sensors, physical property data from a product; and transmit, over the one or more wireless networks, the physical property data from the automated physical property data collector to the external database, the transmitted physical property data being stored in the external database and made accessible to a user via one or more client devices.

The system may be further comprised of a data aggregator in wireless communication with the automated physical property data collector and the external database.

In an embodiment, the one or more collector sensors may transmit the physical property data to the collector microcontroller, and the collector microcontroller may transmit the physical property data to the data aggregator, wherein the data aggregator may transmit the physical property data to the external database.

In another embodiment, the automated physical property data collector may be further comprised of a collector communication module, in electrical communication with the collector battery, communicatively coupled to the collector microcontroller, and in wireless communication with the external database via the one or more wireless networks.

Further, the machine executable instructions, when executed by the collector microcontroller, may further cause the automated physical property data collector to: collect, via the collector communication module, location data from the product. The one or more collector sensors may transmit the physical property data to the collector microcontroller, the collector microcontroller may transmit the physical property data to the collector communication module, and the collector communication module may collect the location data and transmit the physical property data and the location data to the external database. The external database may be comprised of a blockchain.

In an embodiment, the system may be further comprised of a tag in wireless communication with the automated physical property data collector. The tag may be comprised of a scannable element. Upon scanning the scannable element with the one or more client devices 102-106, the user may access the physical property data for the product stored within the external database.

In yet a further embodiment, the system may be further comprised of a wand including a wand battery; and a wand microcontroller in electrical communication with the wand battery. The wand microcontroller may wirelessly communicate with the collector microcontroller, such that the collector microcontroller is able to transmit physical property data from the automated physical property data collectors to the wand.

Additionally, the one or more collector sensors may transmit the physical property data to the collector microcontroller, the collector microcontroller may transmit the physical property data to the wand microcontroller, the wand microcontroller may transmit the physical property data to a data aggregator, and the data aggregator may transmit the physical property data to the external database.

In another embodiment, the wand may be further comprised of a wand communication module, in electrical communication with the wand battery, communicatively coupled to the wand microcontroller, and in wireless communication with the external database via the one or more wireless networks.

The wand may be further comprised of a wand GPS module able to collect product location data, the wand GPS module: in electrical communication with the wand battery, and communicatively coupled to at least one of the wand microcontroller and the wand communication module.

The one or more collector sensors may transmit the physical property data to the collector microcontroller, the collector microcontroller transmits the physical property data to the wand microcontroller, the wand microcontroller transmits the physical property data to the wand communication module, the wand GPS module transmits the product location data to the wand communication module, and the wand communication module transmits the physical property data and the product location data to the external database.

BRIEF DESCRIPTION OF THE DRAWINGS

The incorporated drawings, which are incorporated in and constitute a part of this specification exemplify the aspects of the present disclosure and, together with the description, explain and illustrate principles of this disclosure.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific aspects, and implementations consistent with principles of this disclosure. These implementations are described in sufficient detail to enable those skilled in the art to practice the disclosure and it is to be understood that other implementations may be utilized and that structural changes and/or substitutions of various elements may be made without departing from the scope and spirit of this disclosure. The following detailed description is, therefore, not to be construed in a limited sense.

It is noted that description herein is not intended as an extensive overview, and as such, concepts may be simplified in the interests of clarity and brevity.

All documents mentioned in this application are hereby incorporated by reference in their entirety. Any process described in this application may be performed in any order and may omit any of the steps in the process. Processes may also be combined with other processes or steps of other processes.

Figure 1:
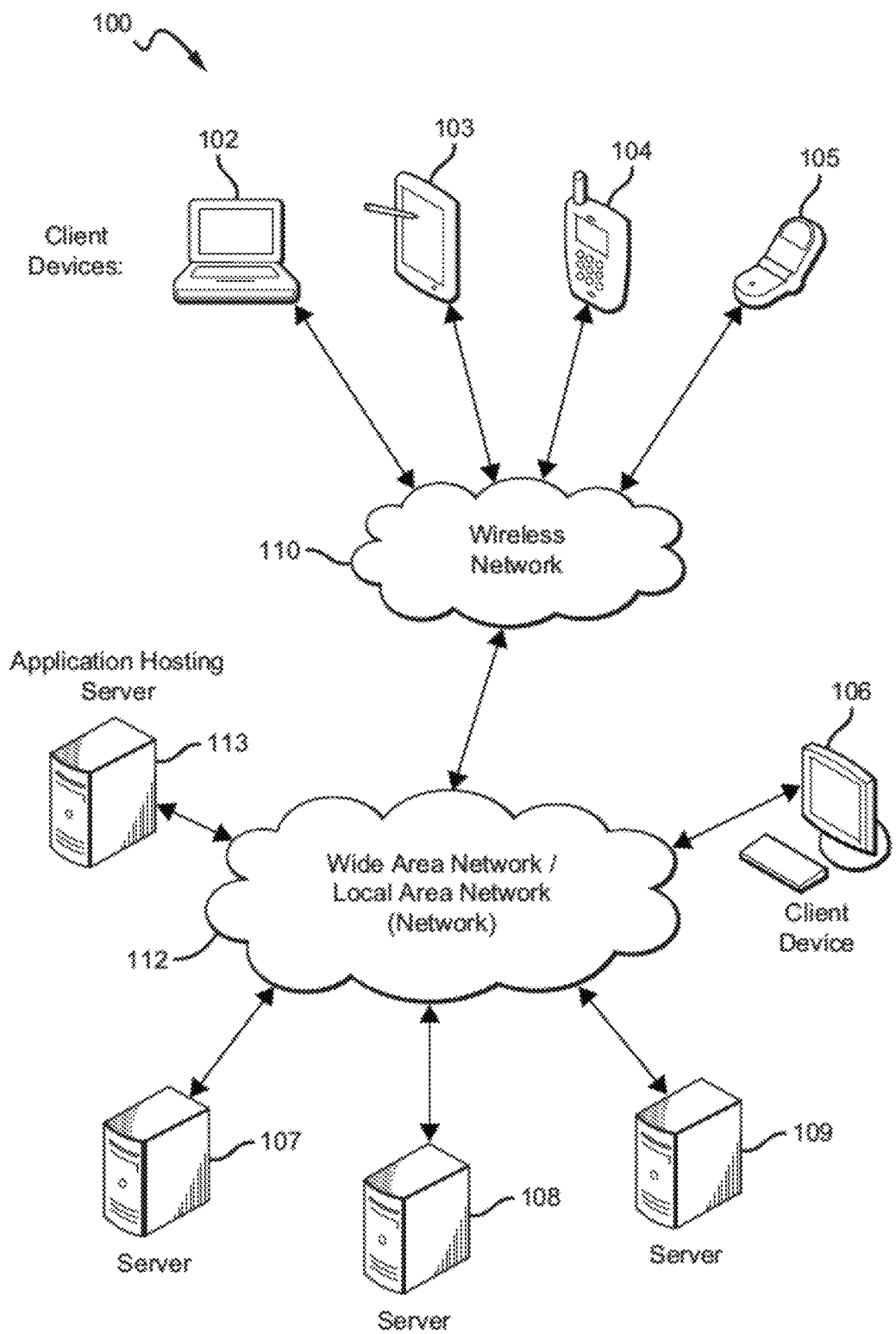
FIG. 1 illustrates an embodiment of an environment in which the systems and methods of the present disclosure may be practiced.

FIG. 1 illustrates components of one embodiment of an environment in which the present disclosure may be practiced. Not all of the components may be required to practice the present disclosure, and variations in the arrangement and type of the components may be made without departing from the spirit or scope of the present disclosure. As shown, the system 100 includes one or more Local Area Networks ("LANs")/Wide Area Networks ("WANs") 112, one or more wireless networks 110, one or more wired or wireless client devices 106, mobile or other wireless client devices 102-105, servers 107-109, and may include or communicate with one or more data stores or databases. The client devices 102-106 may include, for example, at least one of desktop computers, laptop computers, set top boxes, tablets, cell phones, smart phones, smart speakers, wearable devices (such as the Apple Watch) and the like. Servers 107-109 can include, for example, one or more application servers, content servers, search servers, and the like. FIG. 1 also illustrates application hosting server 113.

Figure 2:
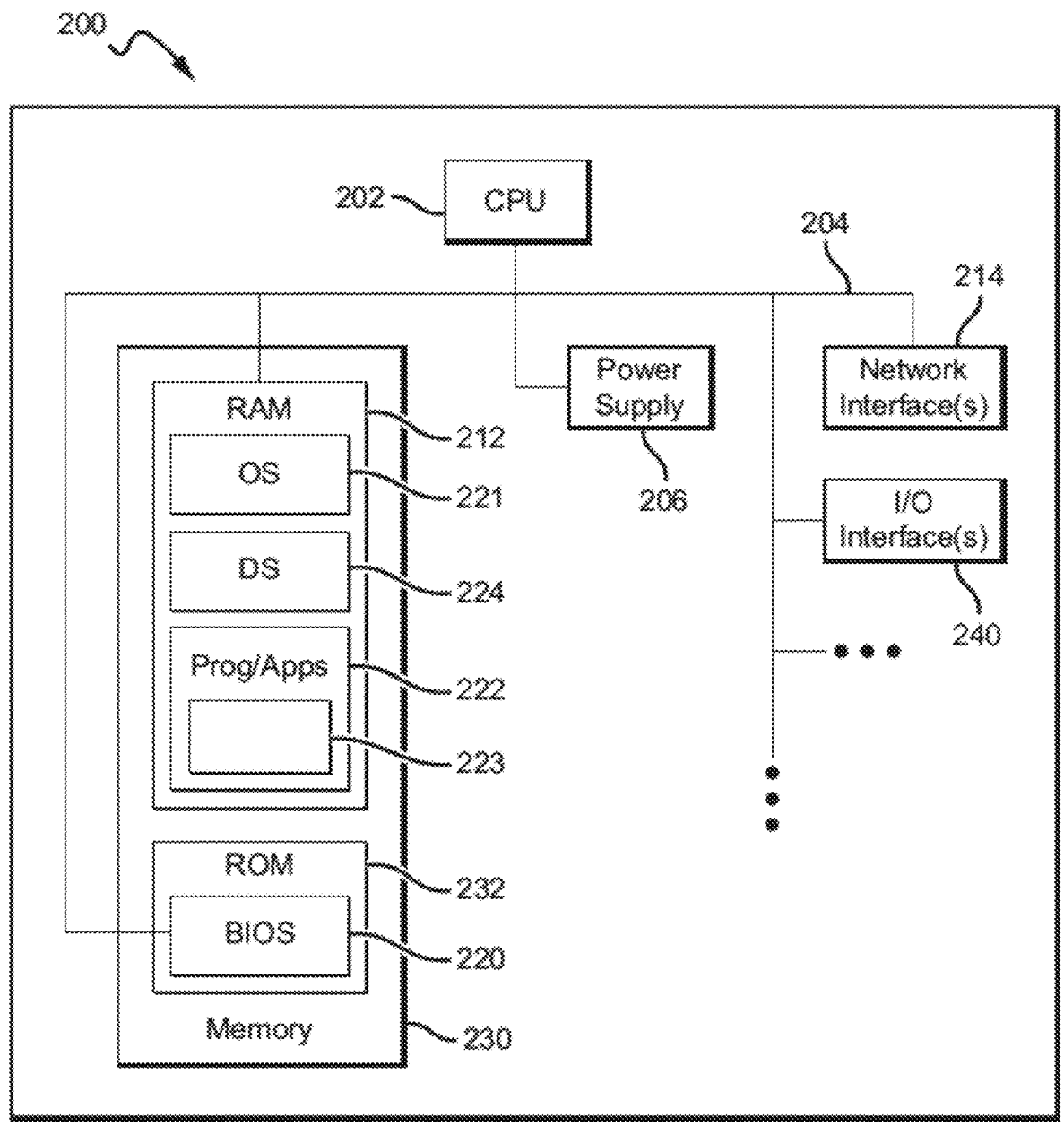
FIG. 2 illustrates an embodiment of a block diagram of an electronic device.
Figure 3:
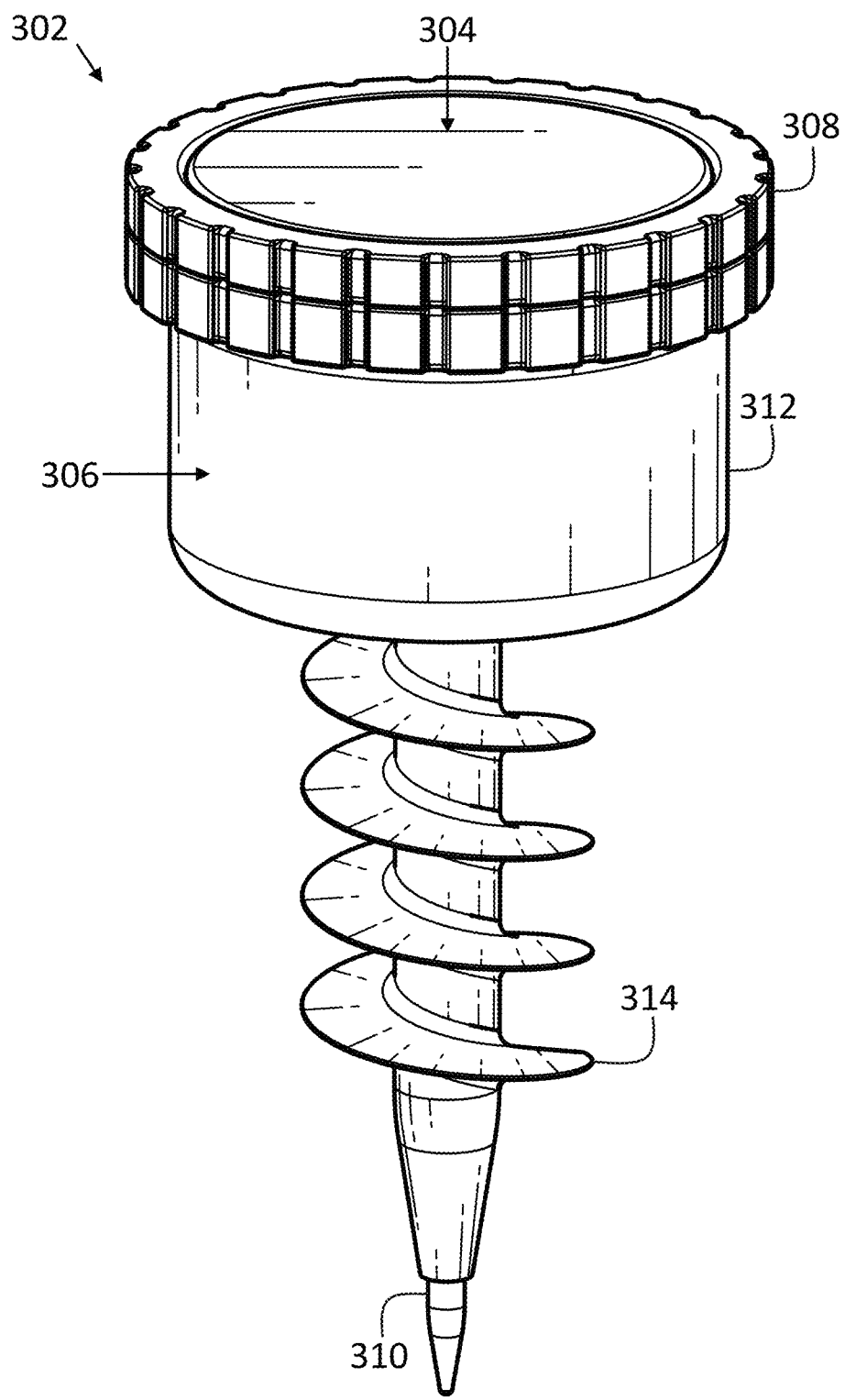
FIG. 3 illustrates an embodiment of an automated physical property data collector.
Figure 4:
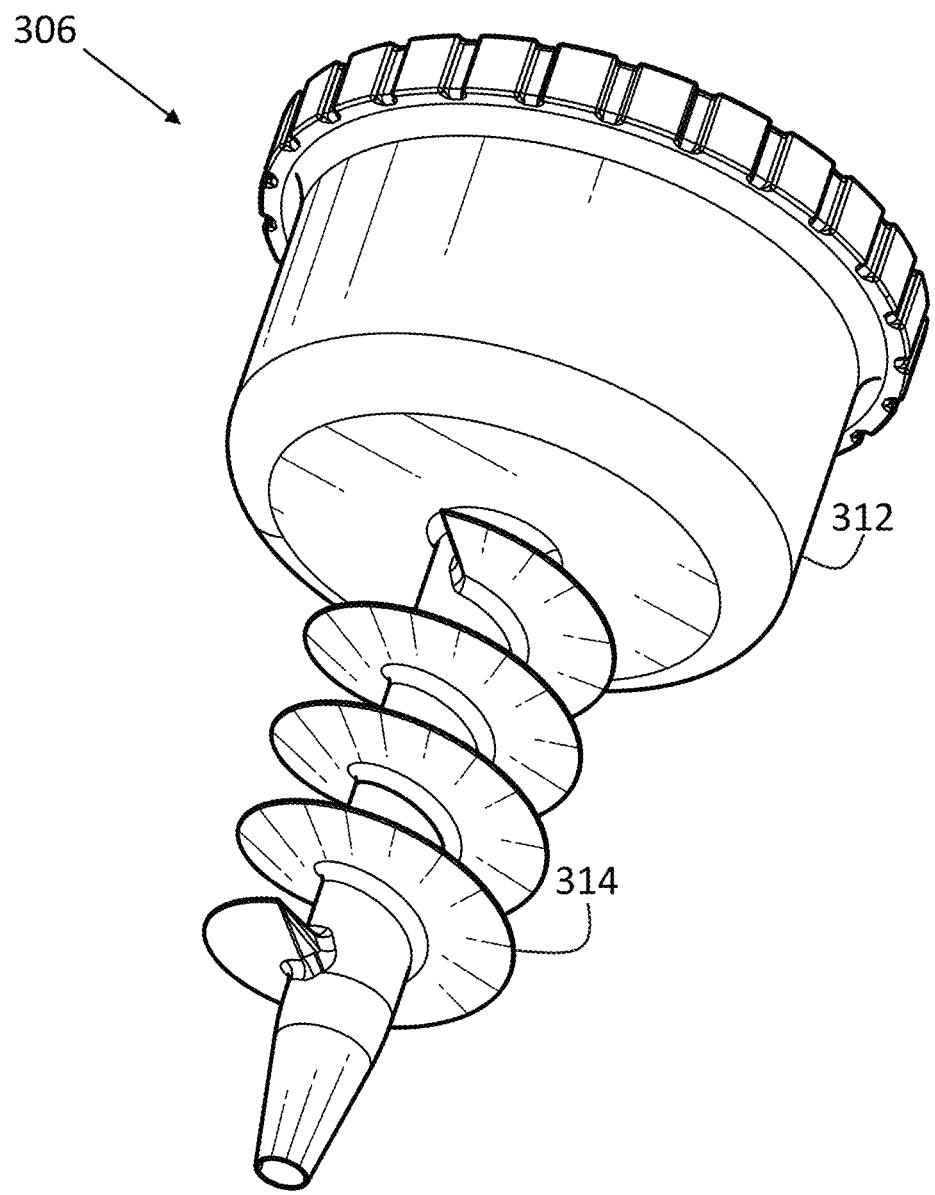
FIG. 4 illustrates an embodiment of the automated physical property data collector.
Figure 5:
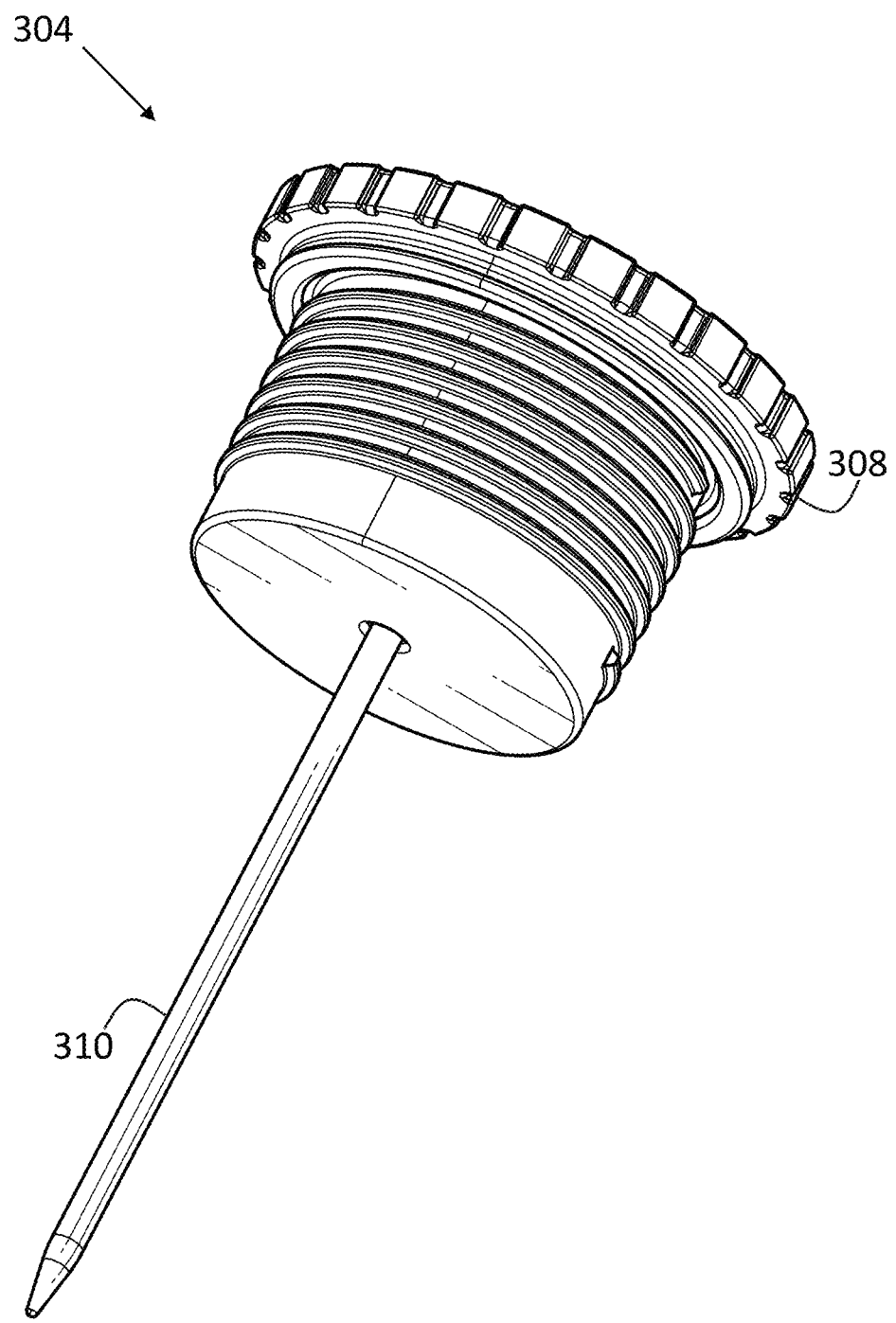
FIG. 5 illustrates an embodiment of the automated physical property data collector.
Figure 6:
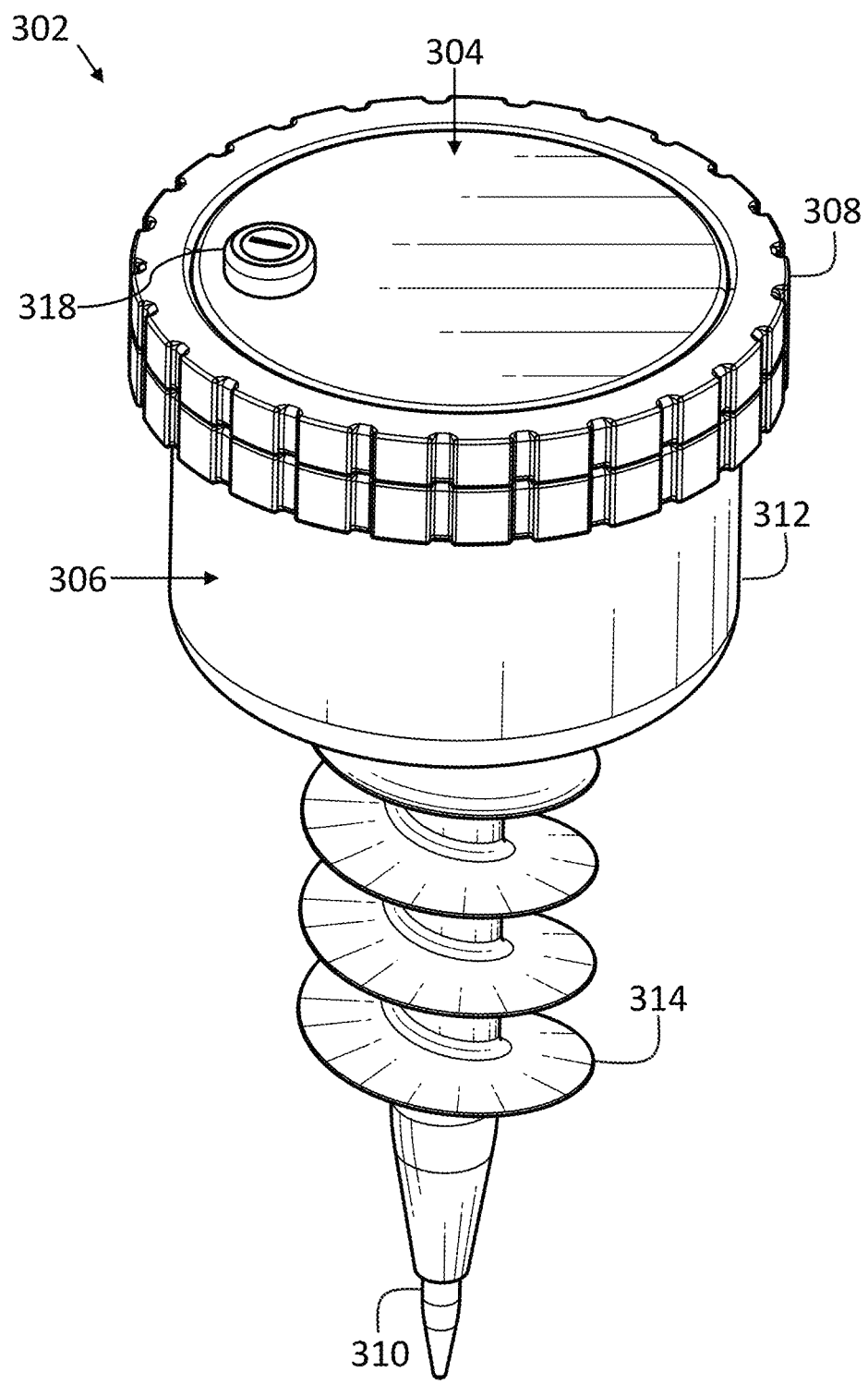
FIG. 6 illustrates an embodiment of the automated physical property data collector.
Figure 7:
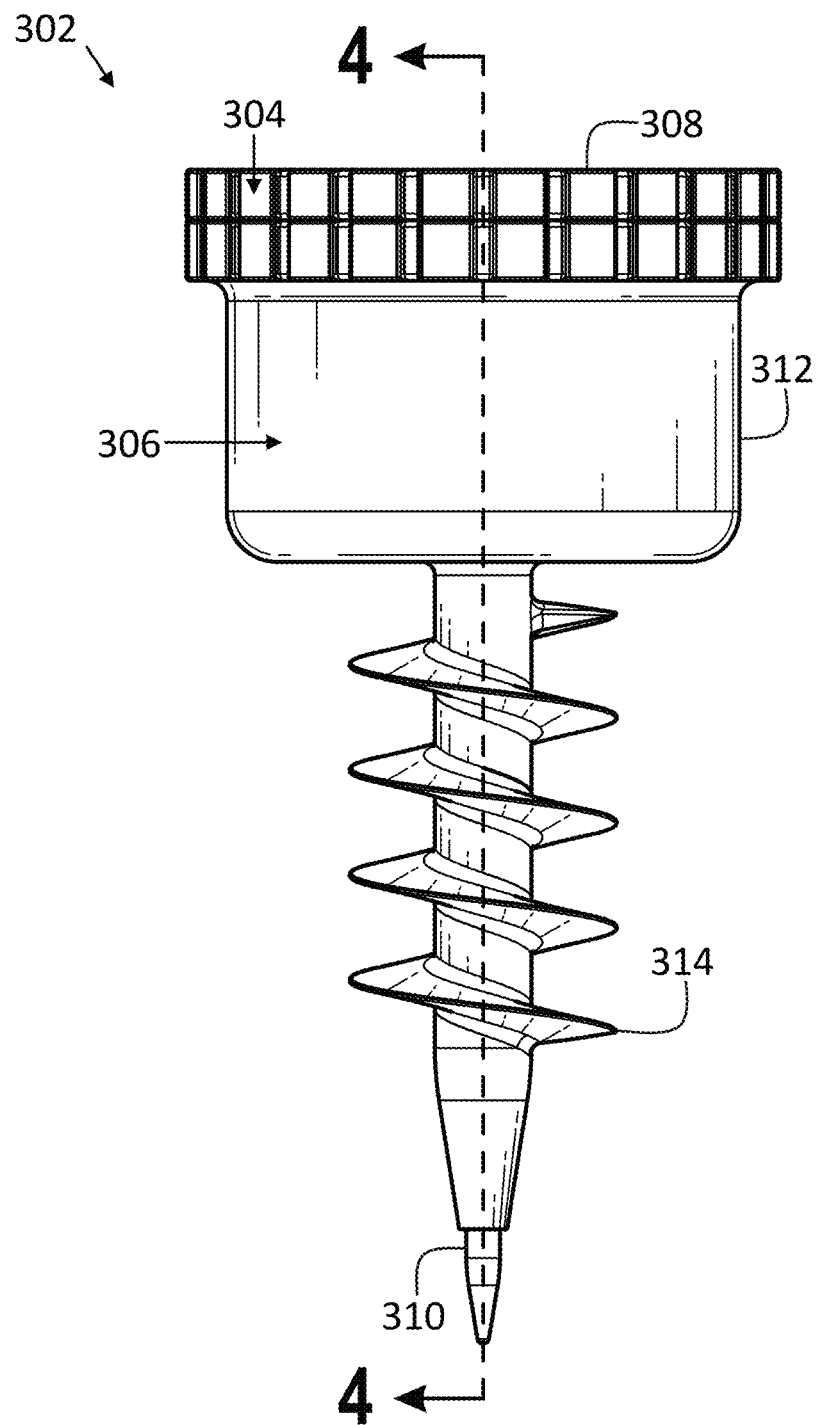
FIG. 7 illustrates an embodiment of the automated physical property data collector.
Figure 8:
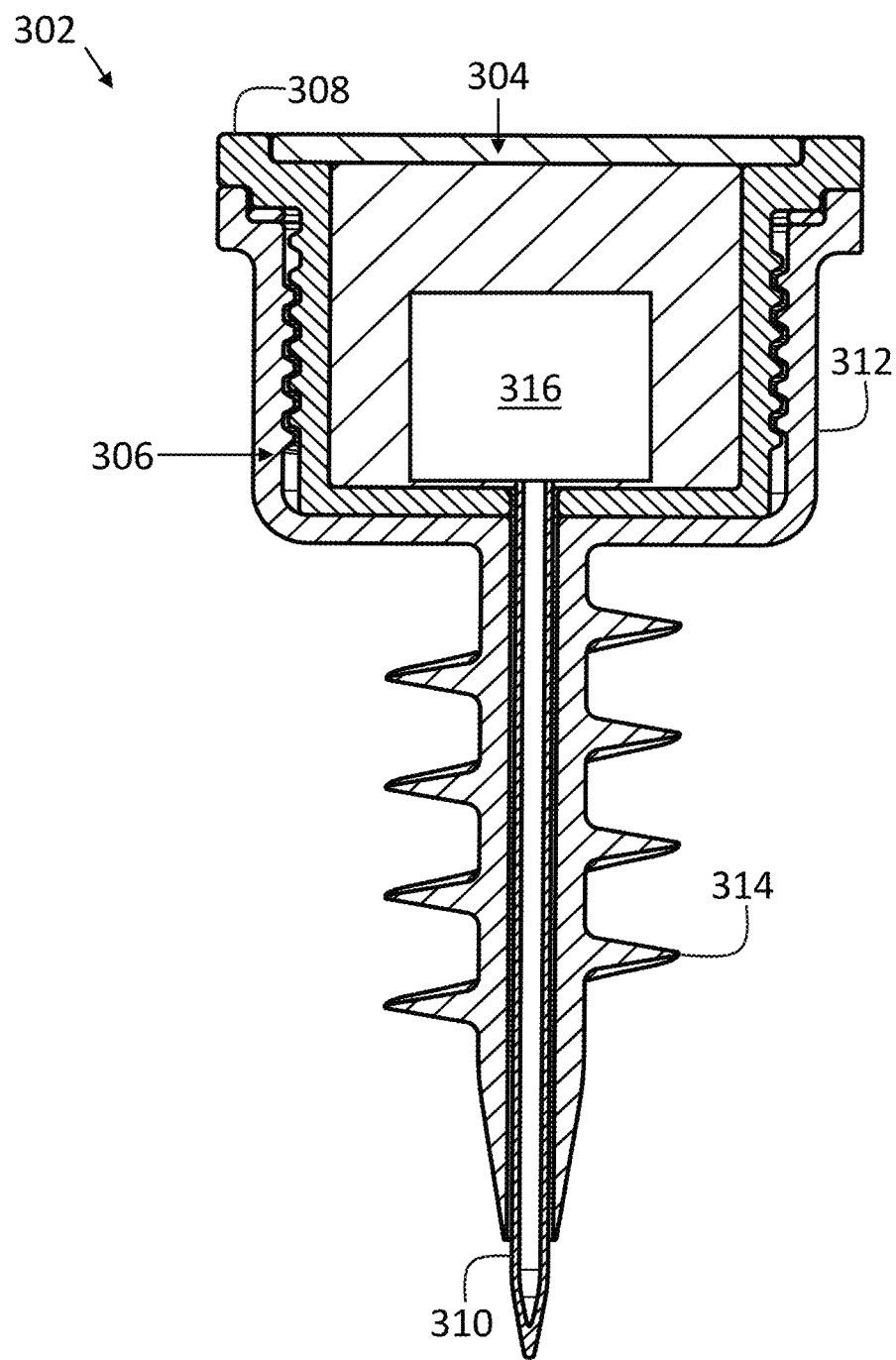
FIG. 8 illustrates an embodiment of the automated physical property data collector.

FIG. 2 illustrates a block diagram of an electronic device 200 that can implement one or more aspects of an apparatus, system, and method for measurement and secure transmission of physical properties (the "Engine") according to one embodiment of the present disclosure. Instances of the electronic device 200 may include servers, e.g., servers 107-109, and client devices, e.g., client devices 102-106. In general, the electronic device 200 can include a processor/CPU 202, memory 230, a power supply 206, and input/output (I/O) components/devices 240, e.g., microphones, speakers, displays, touchscreens, keyboards, mice, keypads, microscopes, GPS components, cameras, heart rate sensors, light sensors, accelerometers, targeted biometric sensors, etc., which may be operable, for example, to provide graphical user interfaces or text user interfaces.

A user may provide input via a touchscreen of an electronic device 200. A touchscreen may determine whether a user is providing input by, for example, determining whether the user is touching the touchscreen with a part of the user's body such as his or her fingers. The electronic device 200 can also include a communications bus 204 that connects the aforementioned elements of the electronic device 200. Network interfaces 214 can include a receiver and a transmitter (or transceiver), and one or more antennas for wireless communications.

The processor 202 can include one or more of any type of processing device, e.g., a Central Processing Unit (CPU), and a Graphics Processing Unit (GPU). Also, for example, the processor can be central processing logic, or other logic, may include hardware, firmware, software, or combinations thereof, to perform one or more functions or actions, or to cause one or more functions or actions from one or more other components. Also, based on a desired application or need, central processing logic, or other logic, may include, for example, a software-controlled microprocessor, discrete logic, e.g., an Application Specific Integrated Circuit (ASIC), a programmable/programmed logic device, memory device containing instructions, etc., or combinatorial logic embodied in hardware. Furthermore, logic may also be fully embodied as software.

The memory 230, which can include Random Access Memory (RAM) 212 and Read Only Memory (ROM) 232, can be enabled by one or more of any type of memory device, e.g., a primary (directly accessible by the CPU) or secondary (indirectly accessible by the CPU) storage device (e.g., flash memory, magnetic disk, optical disk, and the like). The RAM can include an operating system 221, data storage 224, which may include one or more databases, and programs and/or applications 222, which can include, for example, software aspects of the program 223. The ROM 232 can also include Basic Input/Output System (BIOS) 220 of the electronic device.

Software aspects of the program 223 are intended to broadly include or represent all programming, applications, algorithms, models, software, and other tools necessary to implement or facilitate methods and systems according to embodiments of the present disclosure. The elements may exist on a single computer or be distributed among multiple computers, servers, devices, or entities.

The power supply 206 contains one or more power components and facilitates supply and management of power to the electronic device 200.

The input/output components, including Input/Output (I/O) interfaces 240, can include, for example, any interfaces for facilitating communication between any components of the electronic device 200, components of external devices (e.g., components of other devices of the network or system 100), and end users. For example, such components can include a network card that may be an integration of a receiver, a transmitter, a transceiver, and one or more input/output interfaces. A network card, for example, can facilitate wired or wireless communication with other devices of a network. In cases of wireless communication, an antenna can facilitate such communication. Also, some of the input/output interfaces 240 and the bus 204 can facilitate communication between components of the electronic device 200, and in an example can ease processing performed by the processor 202.

Where the electronic device 200 is a server, it can include a computing device that can be capable of sending or receiving signals, e.g., via a wired or wireless network, or may be capable of processing or storing signals, e.g., in memory as physical memory states. The server may be an application server that includes a configuration to provide one or more applications, e.g., aspects of the Engine, via a network to another device. Also, an application server may, for example, host a web site that can provide a user interface for administration of example aspects of the Engine.

Any computing device capable of sending, receiving, and processing data over a wired and/or a wireless network may act as a server, such as in facilitating aspects of implementations of the Engine. Thus, devices acting as a server may include devices such as dedicated rack-mounted servers, desktop computers, laptop computers, set top boxes, integrated devices combining one or more of the preceding devices, and the like.

Servers may vary widely in configuration and capabilities, but they generally include one or more central processing units, memory, mass data storage, a power supply, wired or wireless network interfaces, input/output interfaces, and an operating system such as Windows Server, Mac OS X, Unix, Linux, FreeBSD, and the like.

A server may include, for example, a device that is configured, or includes a configuration, to provide data or content via one or more networks to another device, such as in facilitating aspects of an example apparatus, system, and method of the Engine. One or more servers may, for example, be used in hosting a Web site, such as the web site www.microsoft.com. One or more servers may host a variety of sites, such as, for example, business sites, informational sites, social networking sites, educational sites, wikis, financial sites, government sites, personal sites, and the like.

Servers may also, for example, provide a variety of services, such as Web services, third-party services, audio services, video services, email services, HTTP or HTTPS services, Instant Messaging (IM) services, Short Message Service (SMS) services, Multimedia Messaging Service (MMS) services, File Transfer Protocol (FTP) services, Voice Over IP (VOIP) services, calendaring services, phone services, and the like, all of which may work in conjunction with example aspects of an example systems and methods for the apparatus, system and method embodying the Engine. Content may include, for example, text, images, audio, video, and the like.

In example aspects of the apparatus, system and method embodying the Engine, client devices may include, for example, any computing device capable of sending and receiving data over a wired and/or a wireless network. Such client devices may include desktop computers as well as portable devices such as cellular telephones, smart phones, display pagers, Radio Frequency (RF) devices, Infrared (IR) devices, Personal Digital Assistants (PDAs), handheld computers, GPS-enabled devices tablet computers, sensor-equipped devices, laptop computers, set top boxes, wearable computers such as the Apple Watch and Fitbit, integrated devices combining one or more of the preceding devices, and the like.

Client devices such as client devices 102-106, as may be used in an example apparatus, system and method embodying the Engine, may range widely in terms of capabilities and features. For example, a cell phone, smart phone, or tablet may have a numeric keypad and a few lines of monochrome Liquid-Crystal Display (LCD) display on which only text may be displayed. In another example, a Web-enabled client device may have a physical or virtual keyboard, data storage (such as flash memory or SD cards), accelerometers, gyroscopes, respiration sensors, body movement sensors, proximity sensors, motion sensors, ambient light sensors, moisture sensors, temperature sensors, compass, barometer, fingerprint sensor, face identification sensor using the camera, pulse sensors, heart rate variability (HRV) sensors, beats per minute (BPM) heart rate sensors, microphones (sound sensors), speakers, GPS or other location-aware capability, and a 2D or 3D touch-sensitive color screen on which both text and graphics may be displayed. In some embodiments multiple client devices may be used to collect a combination of data. For example, a smart phone may be used to collect movement data via an accelerometer and/or gyroscope and a smart watch (such as the Apple Watch) may be used to collect heart rate data. The multiple client devices (such as a smart phone and a smart watch) may be communicatively coupled.

Client devices, such as client devices 102-106, for example, as may be used in an example apparatus, system and method implementing the Engine, may run a variety of operating systems, including personal computer operating systems such as Windows, iOS or Linux, and mobile operating systems such as iOS, Android, Windows Mobile, and the like.

Client devices may be used to run one or more applications that are configured to send or receive data from another computing device. Client applications may provide and receive textual content, multimedia information, and the like. Client applications may perform actions such as browsing webpages, using a web search engine, interacting with various apps stored on a smart phone, sending and receiving messages via email, SMS, or MMS, playing games (such as fantasy sports leagues), receiving advertising, watching locally stored or streamed video, or participating in social networks.

In example aspects of the apparatus, system and method implementing the Engine, one or more networks, such as networks 110 or 112, for example, may couple servers and client devices with other computing devices, including through wireless network to client devices. A network may be enabled to employ any form of computer readable media for communicating information from one electronic device to another. The computer readable media may be non-transitory. A network may include the Internet in addition to Local Area Networks (LANs), Wide Area Networks (WANs), direct connections, such as through a Universal Serial Bus (USB) port, other forms of computer-readable media (computer-readable memories), or any combination thereof. On an interconnected set of LANs, including those based on differing architectures and protocols, a router acts as a link between LANs, enabling data to be sent from one to another.

Communication links within LANs may include twisted wire pair or coaxial cable, while communication links between networks may utilize analog telephone lines, cable lines, optical lines, full or fractional dedicated digital lines including T1, T2, T3, and T4, Integrated Services Digital Networks (ISDNs), Digital Subscriber Lines (DSLs), wireless links including satellite links, optic fiber links, or other communications links known to those skilled in the art. Furthermore, remote computers and other related electronic devices could be remotely connected to either LANs or WANs via a modem and a telephone link.

A wireless network, such as wireless network 110, as in an example apparatus, system and method implementing the Engine, may couple devices with a network. A wireless network may employ stand-alone ad-hoc networks, mesh networks, Wireless LAN (WLAN) networks, cellular networks, and the like.

A wireless network may further include an autonomous system of terminals, gateways, routers, or the like connected by wireless radio links, or the like. These connectors may be configured to move freely and randomly and organize themselves arbitrarily, such that the topology of wireless network may change rapidly. A wireless network may further employ a plurality of access technologies including 2nd (2G), 3rd (3G), 4th (4G) generation, Long Term Evolution (LTE) radio access for cellular systems, WLAN, Wireless Router (WR) mesh, and the like. Access technologies such as 2G, 2.5G, 3G, 4G, and future access networks may enable wide area coverage for client devices, such as client devices with various degrees of mobility. For example, a wireless network may enable a radio connection through a radio network access technology such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, and the like. A wireless network may include virtually any wireless communication mechanism by which information may travel between client devices and another computing device, network, and the like.

Internet Protocol (IP) may be used for transmitting data communication packets over a network of participating digital communication networks, and may include protocols such as TCP/IP, UDP, DECnet, NetBEUI, IPX, Appletalk, and the like. Versions of the Internet Protocol include IPv4 and IPv6. The Internet includes local area networks (LANs), Wide Area Networks (WANs), wireless networks, and long-haul public networks that may allow packets to be communicated between the local area networks. The packets may be transmitted between nodes in the network to sites each of which has a unique local network address. A data communication packet may be sent through the Internet from a user site via an access node connected to the Internet. The packet may be forwarded through the network nodes to any target site connected to the network provided that the site address of the target site is included in a header of the packet. Each packet communicated over the Internet may be routed via a path determined by gateways and servers that switch the packet according to the target address and the availability of a network path to connect to the target site.

The header of the packet may include, for example, the source port (16 bits), destination port (16 bits), sequence number (32 bits), acknowledgement number (32 bits), data offset (4 bits), reserved (6 bits), checksum (16 bits), urgent pointer (16 bits), options (variable number of bits in multiple of 8 bits in length), padding (may be composed of all zeros and includes a number of bits such that the header ends on a 32 bit boundary). The number of bits for each of the above may also be higher or lower.

A "content delivery network" or "content distribution network" (CDN), as may be used in an example apparatus, system and method implementing the Engine, generally refers to a distributed computer system that comprises a collection of autonomous computers linked by a network or networks, together with the software, systems, protocols and techniques designed to facilitate various services, such as the storage, caching, or transmission of content, streaming media and applications on behalf of content providers. Such services may make use of ancillary technologies including, but not limited to, "cloud computing," distributed storage, DNS request handling, provisioning, data monitoring and reporting, content targeting, personalization, and business intelligence. A CDN may also enable an entity to operate and/or manage a third party's web site infrastructure, in whole or in part, on the third party's behalf.

A Peer-to-Peer (or P2P) computer network relies primarily on the computing power and bandwidth of the participants in the network rather than concentrating it in a given set of dedicated servers. P2P networks are typically used for connecting nodes via largely ad hoc connections. A pure peer-to-peer network does not have a notion of clients or servers, but only equal peer nodes that simultaneously function as both "clients" and "servers" to the other nodes on the network.

Embodiments of the present disclosure include apparatuses, systems, and methods implementing the Engine. Embodiments of the present disclosure may be implemented on one or more of client devices 102-106, which are communicatively coupled to servers including servers 107-109. Moreover, client devices 102-106 may be communicatively (wirelessly or wired) coupled to one another. In particular, software aspects of the Engine may be implemented in the program 223. The program 223 may be implemented on one or more client devices 102-106, one or more servers 107-109, and 113, or a combination of one or more client devices 102-106, and one or more servers 107-109 and 113.

In an embodiment, the system may receive, process, generate and/or store time series data. The system may include an application programming interface (API). The API may include an API subsystem. The API subsystem may allow a data source to access data. The API subsystem may allow a third-party data source to send the data. In one example, the third-party data source may send JavaScript Object Notation ("JSON")-encoded object data. In an embodiment, the object data may be encoded as XML-encoded object data, query parameter encoded object data, or byte-encoded object data.

Disclosed herein are systems and methods for contemporaneous measurement and secure transmission of physical property data. The system may enhance access to a product's physical property data, including, but not limited to the product's internal temperature, humidity, fluid and/or pollutant concentrations, gas composition, etc. In an embodiment, the system may distribute the physical property data to end consumers and/or retailers contemporaneously with the product's movement through a supply chain. In addition to the physical property data, the system may also distribute a product's location data to end consumers and/or retailers. For example, end consumers and/or retailers may track the physical property and location data of a product from the time the product is created and/or harvested as it travels through the supply chain up until said product is received by the end consumer. Alternatively, suppliers, distributors, end users, and/or retailers may access the physical property and location data of a corresponding product after said product has been delivered. In such an embodiment, the end consumers and/or retailers may access an external database to view the product's physical property data.

Further, the physical property data may be encrypted and/or uploaded to the external database (e.g., a blockchain) to proscribe its manipulation and ensure its authenticity as it moves through the supply chain.

In an embodiment, the system for contemporaneous measurement and secure transmission of physical property data may enable product suppliers to better track a product's point of origin via the location data. The ability to track a product's point of origin correspondingly enables product suppliers to better inform consumers and/or retailers of said product's quality.

Moreover, the system may streamline supply chain operations, such that the system may optimize the product supplier's inventory management, reduce lead times, and/or enhance production and planning schedules. Additionally, the system for contemporaneous measurement and secure transmission of physical property data may reduce costs associated with production of the product.

In one or more embodiments, the systems and methods described herein may enable more precise shelf-life projections for food products, thereby reducing waste and increasing profitability for stakeholders involved in their production, distribution, and sale.

In a further embodiment, the system may increase product sustainability via proof of authenticity. To illustrate, product suppliers may review the physical property data of a product prior to its sale, thus enabling the suppliers to change shipping routes to maximize efficiency.

As a consequence of the aforementioned embodiments of the system, consumer satisfaction and product freshness may increase. Moreover, product sustainability may also be increased by capturing detailed information at critical points along the supply chain. For example, recording the time and date a product is harvested or created underscores its freshness, documenting its temperature history affirms safety, and identifying the location in which the product was created or harvested establishes exclusivity. By aggregating and securely storing these data points, the system certifies authenticity, thereby strengthening consumer confidence and potentially broadening market appeal.

The following disclosure of a system for contemporaneous measurement and secure transmission of physical property data (the "system") 300 herein exemplifies the usage of said system 300 for the commercial fishing industry. However, those of skill in the art will appreciate that the system 300 may be utilized within other industries, including, but not limited to, agriculture and meat/dairy production, electronics, healthcare, food and beverage, logistics and transportation, retail grocers, and/or pharmaceuticals.

Turning now to FIGS. 3-8, the System 300 may include an automated physical property data collector (the "collector") 302. In an embodiment, the collector 302 may be comprised of an interior casing 304 and an exterior shell 306. To illustrate, the interior casing 304 may include both a component housing 308 and a probe 310. As a nonlimiting example, the probe 310 may be affixed to a bottom of the component housing 308. In another embodiment, the component housing 308 may house a plurality of internal components 316 (described in more detail below).

Furthermore, the exterior shell 304 may be further comprised of a casing receptacle 312 and an anchoring attachment 314. In an exemplary embodiment, the anchoring attachment 314 may be affixed to a bottom of the casing receptacle 312.

In an embodiment, the collector 302 may be comprised of a food-safe material. For instance, the food-safe material may include, but is not limited to, high-density polyethylene, polypropylene, titanium, etc. However, those having ordinary skill in the art understand that the collector 302 may be comprised of any food-safe material alternative.

In a further embodiment, the interior casing 304 may be reversibly secured to the exterior shell 306. For example, the interior casing 304 and the exterior shell 306 may have corresponding threads such that interior casing 304 may threadably engage with the exterior shell 306. Specifically, the component housing 308 may include threads such that it may threadably engage with the casing receptacle 312. As a nonlimiting example, when the component housing 308 and casing receptacle 312 are threadably engaged, the probe 310 may be housed within an interior channel of the anchoring attachment 314. In such a nonlimiting example, a tip of the probe 310 may extend out of the anchoring attachment 314.

Figure 13:
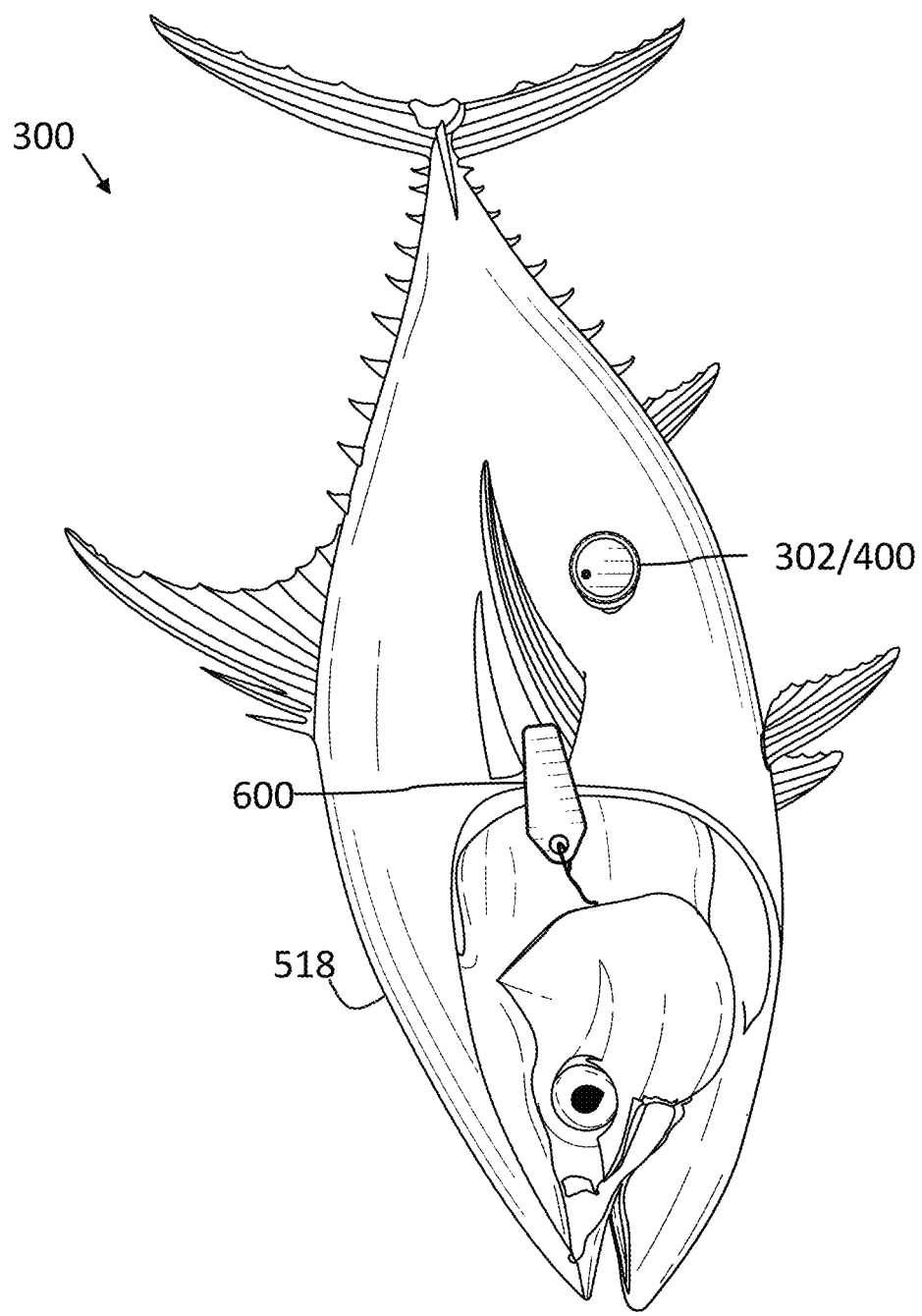
FIG. 13 illustrates an embodiment of the system for contemporaneously measuring and securely transmitting product physical property data.

Moreover, the anchoring attachment 314 may reversibly secure the collector 302 to a product 518. For instance, the anchoring attachment 314 may be threaded and/or unthreaded. In an embodiment, the anchoring attachment 314 may be inserted into the product 518 such that the collector 302 is secure within said product 518. In such an embodiment, upon insertion, the entirety of the anchoring attachment 314 may be lodged within the product 518, while the exterior shell 306 remains outside of the product 518 (as illustrated in FIG. 13). However, the anchoring attachment 314 may bore a cavity within the product 518, such that a top of the interior casing 304 and/or the exterior shell 306 may be flush with an exterior surface of the product 518.

Figure 14:
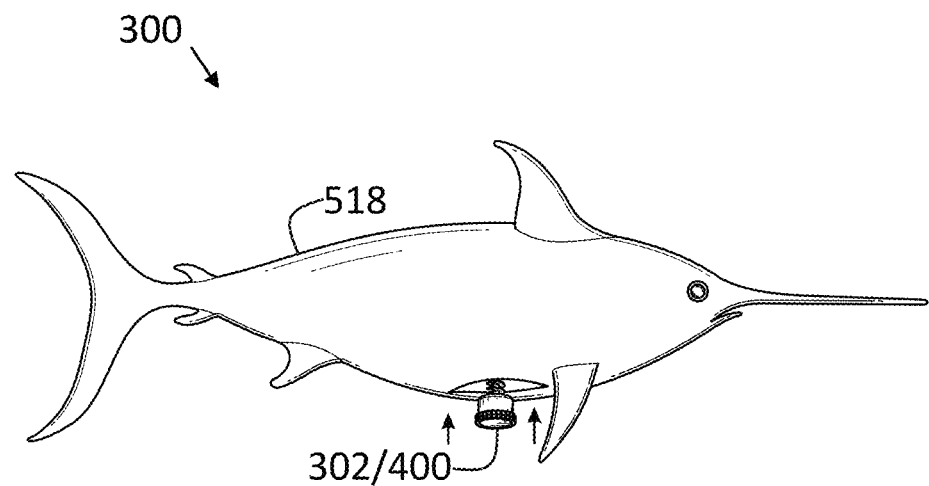
FIG. 14 illustrates an embodiment of the system for contemporaneously measuring and securely transmitting product physical property data.
Figure 15:
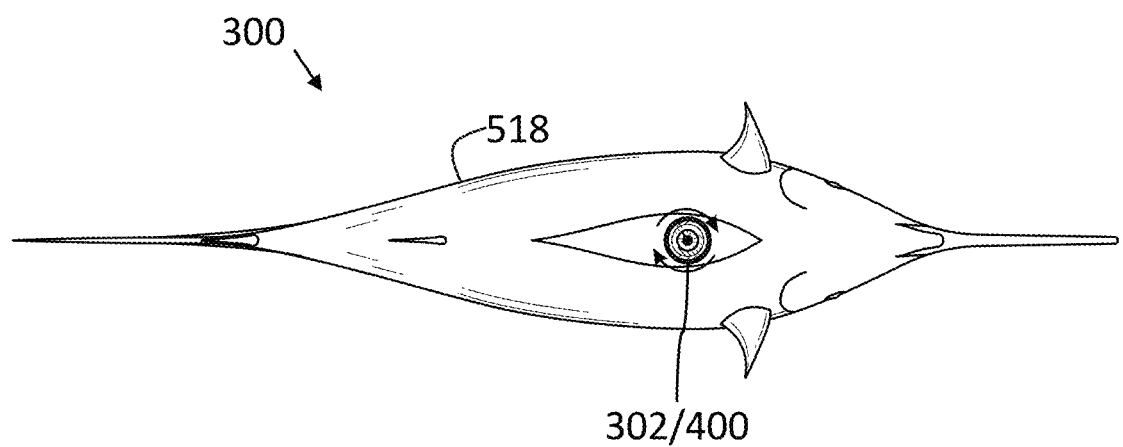
FIG. 15 illustrates an embodiment of the system for contemporaneously measuring and securely transmitting product physical property data.

As a nonlimiting example, after a fish has been caught, a threaded anchoring attachment 314 may be screwed into the fish, such that the anchoring attachment 314 penetrates the skin and resides within the flesh. In such an example, the threaded anchoring attachment 314 may secure the collector 302 to the fish, ensuring said collector 302 may not be unintentionally dislodged from the fish. Particularly, the collector 302 may be inserted into the visceral cavity of the fish (as illustrated in FIGS. 14 and 15).

Moreover, the collector 302 may be further comprised of an activation button 318. In an embodiment, the activation button 318 may be disposed atop the component housing 308. To illustrate, a user may toggle the activation button 318, such that the collector 302 may be in either an on state or an off state. That is, the activation button 318 may activate a battery 502 and/or an activation module 510 of the collector 302 (described in more detail below).

Alternatively, the collector 302 may be toggled between the on state and the off state via the interior casing 304 reversibly coupling with the exterior shell 306. In particular, upon the interior casing 304 being screwed into the exterior shell 306, the collector may be toggled from the off state to the on state. Thus, when the interior casing 304 is removed from the exterior shell 306, the collector 302 may be toggled from the on state to the off state.

Figure 9:
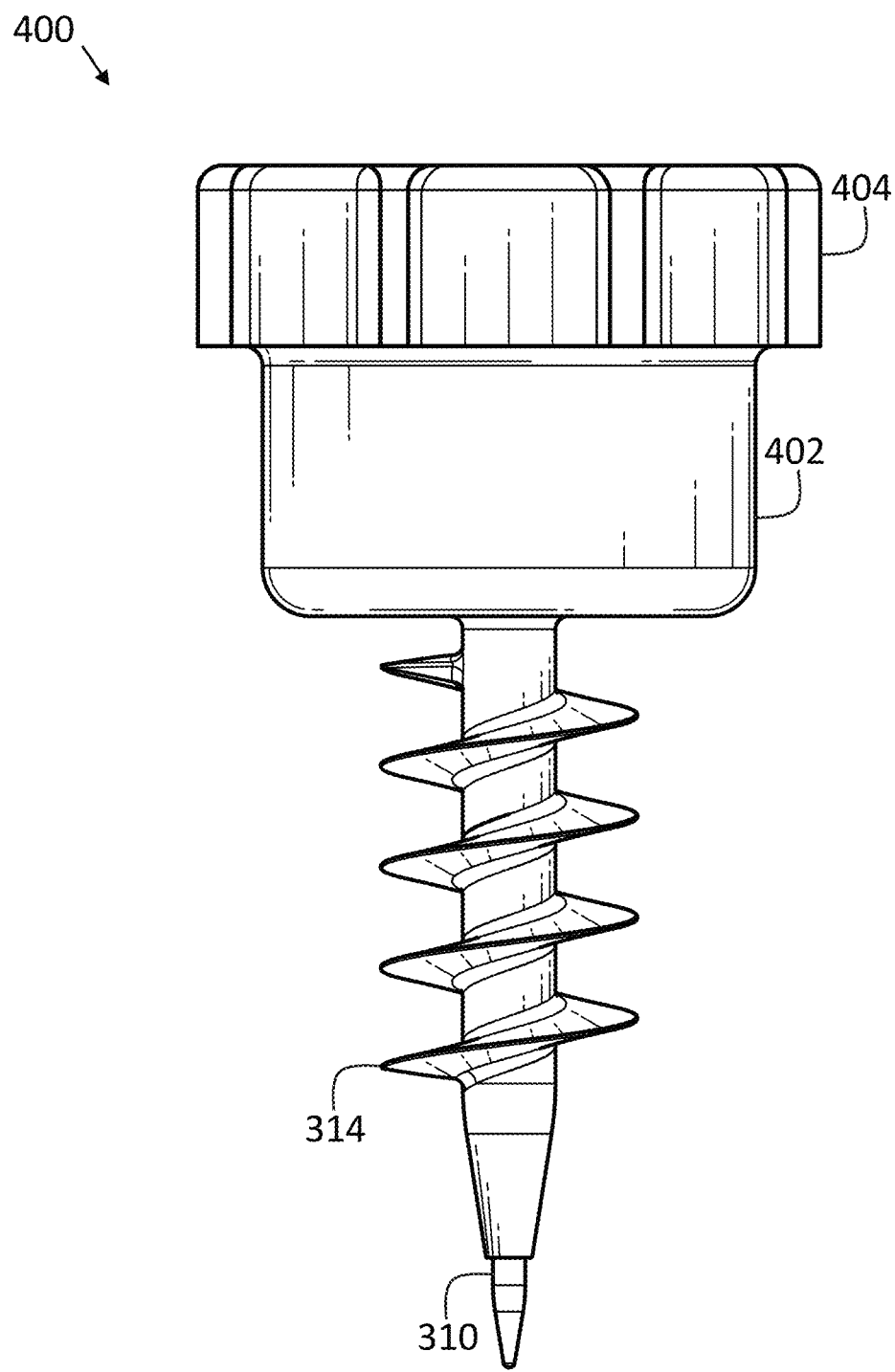
FIG. 9 illustrates an embodiment of an alternative automated physical property data collector.
Figure 10:
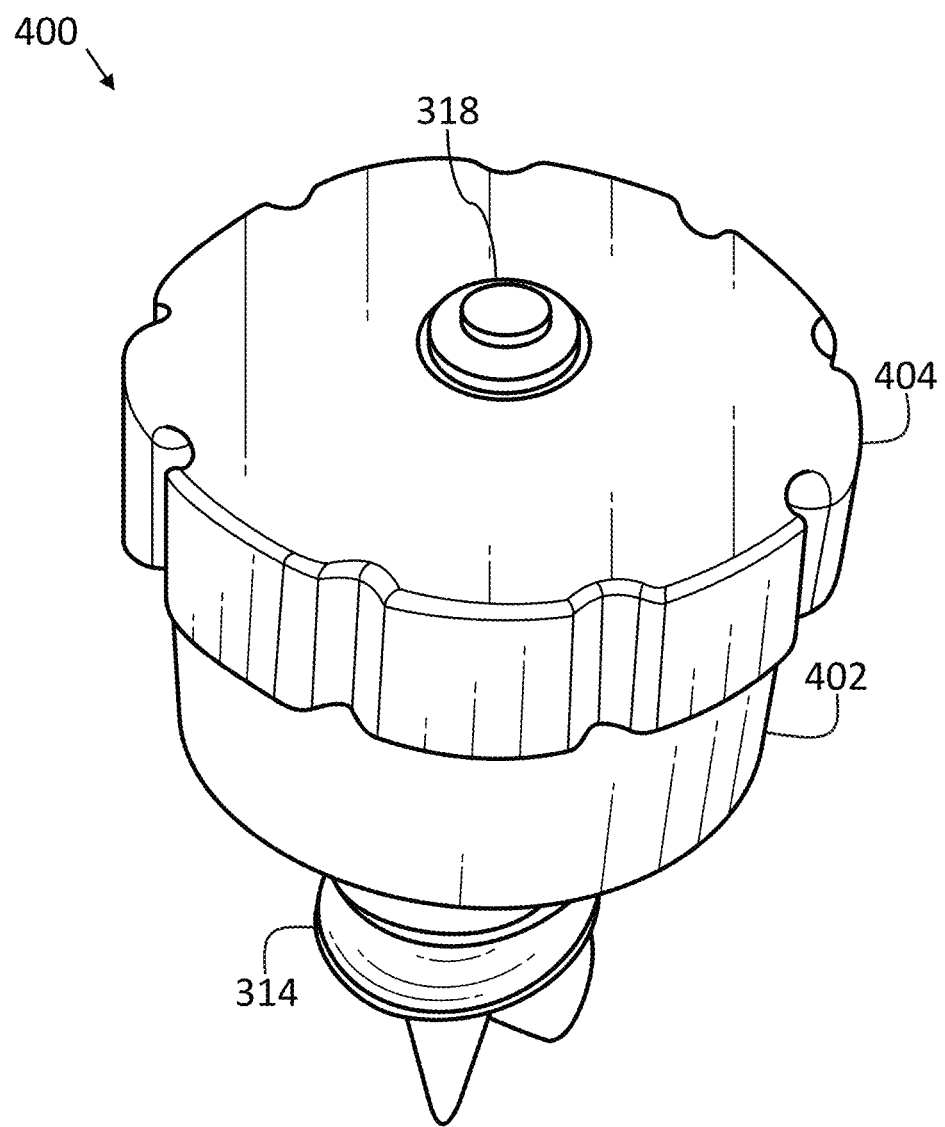
FIG. 10 illustrates an embodiment of the alternative automated physical property data collector.

Moving to FIGS. 9-10, an alternative automated physical property data collector 400 (the "alternative collector") may be illustrated. The alternative collector 400 may be comprised of the same features as that of the collector 302. For example, the alternative collector 400 may be comprised of the probe 310, the anchoring attachment 314, the internal components 316, and the activation button 318. However, in alternative embodiments, the alternative collector 400 may be comprised of different features. Yet further, the alternative collector 400 may be comprised of both features from the collector 302, as well as different features.

To illustrate, the alternative collector 400 may be comprised of a component housing 402 and a cap 404, wherein the component housing 402 may house the plurality of internal components 316 (described in more detail below). In an embodiment, the cap 404 and the component housing 402 may be reversibly coupled. For instance, the cap 404 and the component housing 402 may threadably engage. Specifically, the component housing 402 may include threads, and the cap 404 may include corresponding threads, such that the cap 404 may be screwed onto the component housing 402. Similar to the collector 302, reversibly coupling the cap 404 to the component housing 402 may toggle the alternative collector 400 between the on state and the off state. Alternatively, the activation button 318 may enable the alternative collector 400 to be toggled between the on state and the off state.

Moreover, the anchoring attachment 314 may be disposed upon a bottom side of the component housing 402. In one embodiment, the anchoring attachment 314 may house the probe 310, such that no portion of the probe 310 is exposed to an external environment (as illustrated in FIG. 10).

Figure 11:
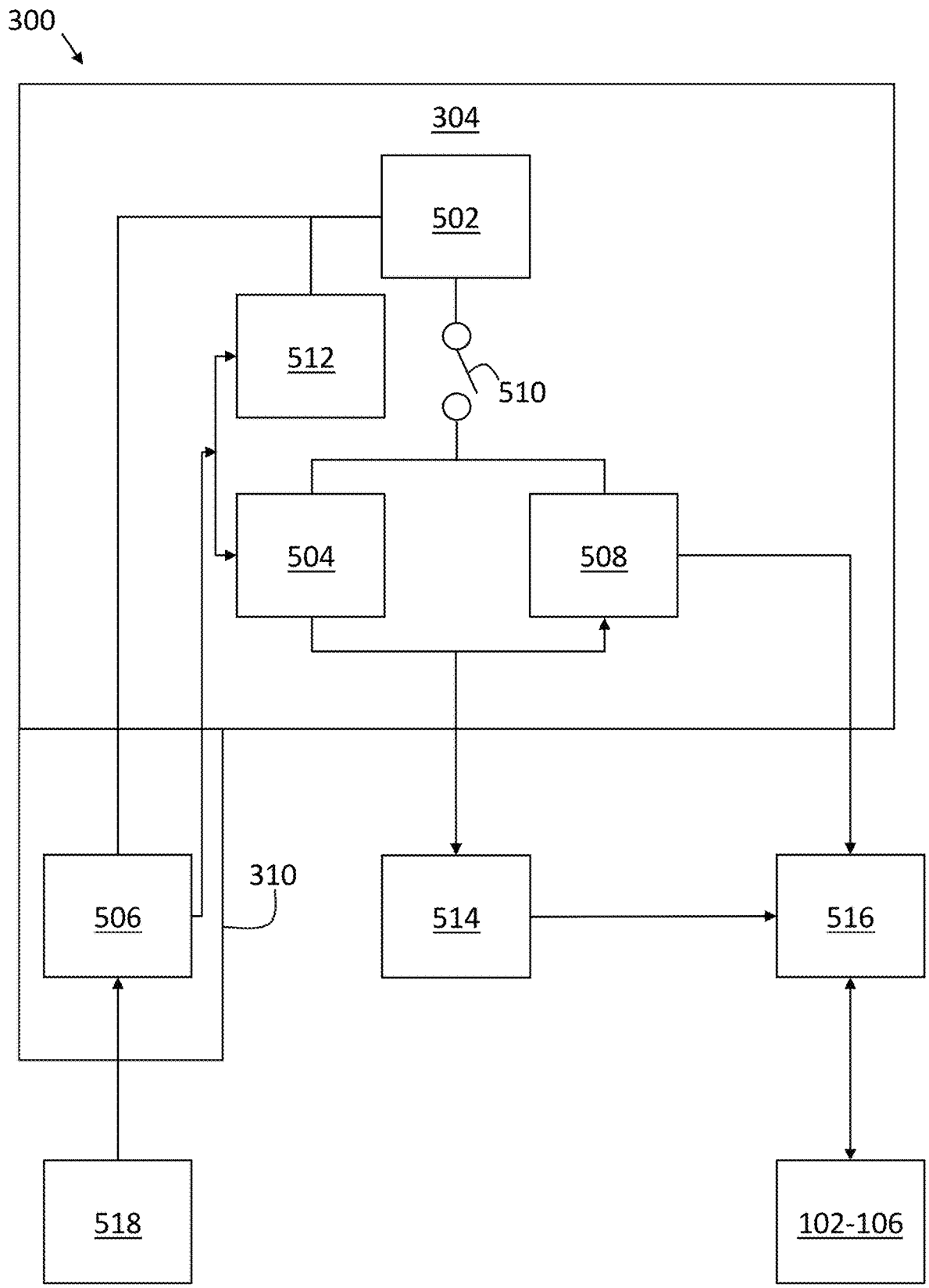
FIG. 11 illustrates an embodiment of a system for contemporaneously measuring and securely transmitting product physical property data.

Referring to FIG. 11, the lines without arrows may represent the movement of electricity, while lines with arrows may represent the flow of physical property data.

As previously mentioned, the collector 302 may include one or more internal components 316. In an embodiment, said internal components 316 may be comprised of at least one of a battery 502, a microcontroller 504, one or more sensors 506, a communication module 508, an activation module 510, and a memory 512.

In an embodiment, the battery 502 may be in electrical communication with one or more of the microcontroller 504, the one or more sensors 506, the communication module 508, the activation module 510, and the memory 512. That is, the battery 502 may provide the microcontroller 504, the one or more sensors 506, the communication module 508, the activation module 510, and the memory 512 with a supply of electricity such that they are operational.

In one embodiment, the battery 502 may be disposed for a single use (i.e., a primary battery). Meaning, once the battery 502 has been depleted (i.e., is unable to sustain a chemical reaction sufficient to produce electricity) it may be disposed of and/or replaced. As a nonlimiting example, the battery 502 may be a lithium coin battery (e.g., Energizer CR2477) capable of producing electricity for up to six months. In another embodiment, a collector 302 utilizing a single use battery may be discarded after one use. Such an embodiment may be preferable in use cases where sterility is of paramount importance. However, the single use battery may be replaced thus rendering the collector 302 reusable.

In an alternative embodiment, the battery 502 may be rechargeable. For instance, upon depletion, the battery 502 may be recharged via a charger. Accordingly, the battery 502 may include a charging port (e.g., a USB-C port) to facilitate reverse coupling between the battery 502 and the charger. However, the battery 502 may not include the charging port, and may instead be charged via inductive charging. Yet further, the battery 502 may include both the charging port and the ability to be charged inductively. As a nonlimiting example, the rechargeable battery may be an alkaline battery, a silver oxide battery, a lithium-ion battery (e.g., an 18650 Lithium-Ion Rechargeable Battery), etc. Thus, collectors 302 utilizing a rechargeable battery may be continuously used so long as said battery remains charged.

As mentioned above, the collector 302 may be further comprised of the microcontroller 504. As described, the microcontroller 504 may be in electrical communication with the battery 502, thus enabling it to be operational. Additionally, the microcontroller 504 may have a low electrical demand thereby extending the period of time the battery 502 is operable. As a nonlimiting example, the microcontroller 504 may be comprised of an ARM Cortex-M family of processor cores due to their energy efficiency. Specifically, the microcontroller 504 may be comprised of an ARM Cortex-M0+ or an ARM Cortex-M4.

Moreover, the microcontroller 504 may, in addition to the battery 502, be in electrical communication with at least one of the one or more sensors 506, the communication module 508, the activation module 510, and the memory 512. For instance, the microcontroller 504 may be comprised of a plurality of inputs and/or a plurality of outputs, wherein said inputs and/or outputs communicatively couple the microcontroller 504 to at least one of the one or more sensors 506, the communication module 508, the activation module 510, and the memory 512. Said communicative coupling may enable the microcontroller 504 to receive and/or transmit data from/to at least one of the one or more sensors 506, the communication module 508, the activation module 510, and the memory 512.

Additionally, the microcontroller 504 may enable the collector 302 to wirelessly communicate with various components of the System 300 (e.g., the one or more client devices 102-106, a data aggregator 514, and an external database 516). In such an embodiment, the microcontroller 504 may wirelessly communicate with said System 300 components via any wireless communication technique known to those having ordinary skill in the art including, but not limited to, Bluetooth, LoRaWAN, the one or more wireless networks 110, Wi-Fi, Zigbee, etc. For instance, the collector 302, via the microcontroller 504, may wirelessly communicate with the System's 300 components via integration with a satellite internet constellation (e.g., Starlink®) or another global network.

As a nonlimiting example, the microcontroller 504 may be a Nordic Semiconductor nRF52810 chip, which incorporates a Bluetooth Low Energy (BLE) module, thus enabling wireless communication between the microcontroller 504 and the System's 300 components.

Further, in embodiments where the microcontroller 504 is able to wirelessly communicate with various other components of the system 300, the need for a separate communication module 508 within the collector 302 may be obviated. In particular, the microcontroller 504 may wirelessly communicate with the data aggregator 514. For instance, the microcontroller 504 may transmit physical property data collected by the one or more sensors 506 to the data aggregator 514. Subsequently, the data aggregator 514 may transmit the physical property data to the external database 516. Alternatively, the microcontroller 504 may transmit physical property data collected by the one or more sensors 506 directly to the external database 516.

Turning to another aspect of the present disclosure, the collector 302 may be further comprised of one or more sensors 506. Similar to the microcontroller 504, the one or more sensors 506 may be in electrical communication with the battery 502, such that said sensors 506 are operational.

In an embodiment, the one or more sensors 506 may collect physical property data from a product 518. For instance, the physical property data collected by the one or more sensors 506 may include the product's 518 internal temperature, humidity, fluid and/or pollutant concentrations, gas composition, etc., in addition to ambient temperature, humidity, air quality, etc.

Specifically, the one or more sensors 506 may include sensors for monitoring the product's 518: internal product temperature, humidity, pH, microbial activity, radiation levels, presence of heavy metals (e.g., mercury), microplastics, oil, and/or natural gas, along with fat and water content. Said metrics may be indicative of the product's 518 quality and/or safety.

In some embodiments, the one or more sensors 506 may only include a temperature sensor to monitor the internal temperature of the product 518. For example, the temperature sensor may be comprised of thermocouples, resistance temperature detectors (RTD), and/or digital temperature sensors. In such an example, the temperature sensor may be accurate within 0.1° C. range. Particularly, the temperature sensor may be comprised of a Texas Instruments TMP117.

In yet another embodiment, multiple temperature sensors may be incorporated into the collector 302, such that the collector 302 may produce an internal temperature gradient map of the product 518. In such an embodiment, the one or more sensors 506 may be disposed within a portion of the probe 310, as illustrated in FIG. 11.

In another embodiment, the one or more sensors 506 may be communicatively coupled to the microcontroller 504, via the microcontroller's 504 plurality of inputs and outputs. In such an embodiment, the one or more sensors 506 may collect physical property data, communicate said data to the microcontroller 504, wherein the microcontroller 504 subsequently stores and/or transmits the data. Further, the one or more sensors 506 may send electrical signals to the microcontroller 504, which are subsequently converted by the microcontroller 504 into the physical property data. Thus, as a nonlimiting example, where the one or more sensors 506 are an RTD, they may detect the product's internal temperature via a temperature dependent electrical resistor, wherein the output resistance is relayed to the microcontroller 504, ultimately leading to a temperature reading.

To illustrate, the RTD may be comprised of a pure metal wire (e.g., platinum wire) disposed within the probe 310. As the internal temperature of the product 518 increases, the resistance of the wire within the RTD may correspondingly increase, and conversely, as the internal temperature of the product 518 decreases, the resistance decreases. Accordingly, to measure the product's 518 internal temperature, an electrical current may be passed through the RTD, and the resistance is determined by observing the extent to which the current is impeded. This change in resistance is then converted into a temperature reading using a calibration curve or formula, based on the known relationship between temperature and resistance for the material used by the microcontroller 504.

Additionally, the physical property data may be compiled and translated into a score. To illustrate, the score may reflect a freshness of the product 518. Further, as the collector 302 transmits physical property data of the product 518 to the external database 516, the system 300 may contemporaneously interpret said data and return a product freshness score. To illustrate, the system 300 may employ a software component that enables the physical property data (e.g., the product's 518: internal temperature, humidity, fluid and/or pollutant concentrations, gas composition, etc.) and/or location data (e.g., the location the product 518 was acquired, the date the product 518 was acquired, the time the product 518 was acquired, the time that has elapsed since the product 518 was acquired, etc.) collected via the collector 302 to be stored, and subsequently analyzed and interpreted.

For instance, the software component may be comprised of Database Management Systems (DBMS) such as SQL-based Databases. In particular, said SQL-based Databases may include MySQL, PostgreSQL, Microsoft SQL Server, Oracle Databases, and SQLite. The software component may also be comprised of data analysis tools including, Microsoft Excel, Google Sheets, Tableau, Power BI, etc. Furthermore, the software component may additionally include statistical and/or machine learning algorithms implemented using programming languages and libraries such as Python (e.g., pandas, NumPy, SciPy, SQLAlchemy), R (e.g., dplyr, ggplot2, tidyr), and MATLAB.

Accordingly, the system 300 may contemporaneously interpret the physical property data and/or location data, via the software component, and return a product freshness score. For example, the collector 302 may transmit the physical property data and/or location data to the external database 516 via the one or more wireless networks 110. Upon the external database's 516 receipt of said data, the software component may analyze and interpret the data. As a nonlimiting example, the software component may calculate an average internal temperature of the product 518 from the time it was acquired, which will subsequently determine its' product freshness score. The product freshness score may be updated as the physical property data of the product 518 changes throughout its movement through the supply chain.

On a different note, the collector 302 may be further comprised of the communication module 508. The communication module 508 may be in electrical communication with the battery 502, such that said module 508 is operational. Moreover, the communication module 508 may be in electrical communication with the microcontroller 504, such that the communication module 508 and microcontroller 504 are communicatively coupled.

Furthermore, the communication module 508 may enable wireless communication between the collector 302 and various components of the system 300. Thus, as described above, in embodiments of the collector 302 where the microcontroller 504 is able to facilitate wireless communication between the collector 302 and the system's 300 components, the communication module 508 may not be included in the collector 302. However, in alternative embodiments, the communication module 508 may enable the collector 302 to wirelessly communicate with the system's 300 components. To illustrate, the collector 302, via the communication module 508, may wirelessly communicate with the system's 300 components via integration with the satellite internet constellation (e.g., Starlink®) or another global network.

In certain embodiments, the communication module 508 may wirelessly communicate with the external database 516 via the one or more wireless networks 110. In said embodiments, the communication module 508 may transmit physical property data to the external database 516 via the one or more wireless networks 110. However, the communication module 508 may wirelessly communicate with said system 300 components via any wireless communication technique known to those having ordinary skill in the art. As a nonlimiting example, the communication module 508 may be a Blues Notecard Cell+WiFi or a Blues Notecard Cellular chip. However, the communication module 508 may be any suitable wireless communication device alternative known to those having ordinary skill in the art.

As mentioned above, the communication module 508 may be communicatively coupled to the microcontroller 504. To illustrate, the microcontroller 504 may transmit physical property data collected by the one or more sensors 506 to the communication module 508. In such an illustration, the communication module 508 may subsequently transmit the physical property data to the external database 516 via the one or more wireless networks 110. However, the communication module 508 may be communicatively coupled to the one or more sensors 506 and/or the memory 512. Thus, the communication module 508 may receive physical property data from the one or more sensors 506 and/or retrieve said data from the memory 512 prior to transmitting it. Alternatively, the communication module 508 and/or microcontroller 504 may store the physical property data collected via the one or more sensors 506 for subsequent transmission to the external database 516.

In addition to enabling wireless communication with the system's 300 components and transmitting physical property data to the external database 516, the communication module 508 may also collect and transmit location data. For instance, the communication module 508 may incorporate a GPS module. In an embodiment, the GPS module may enable the communication module 508 to collect a product's location data, wherein said data is subsequently transmitted to the external database 516 as previously described. The communication module's 508 collection of location data, via the GPS module, and transmission of said data, may enable end consumers to ascertain the point of origin of a product. That is, in the context of commercial fishing, the communication module 508 may collect the location data associated with the location where a fish was caught (i.e., the fish's point of origin), and transmit said data to the external database 516. Moreover, one or more end consumers may access the external database 516, via one or more client devices 102-106 (described in more detail below), to view the location data associated with the location where the fish was caught.

In a further nonlimiting example, transmission of physical property data and/or location data from the microcontroller 504 and/or the communication module 508 to the data aggregator 514 and/or the external database 516 may utilize a communication protocol. In particular, the system 300 may utilize MQTT and/or HTTPS to transmit physical property data and/or location data from the collector 302 to the data aggregator 514 and/or the external database 516. However, those having ordinary skill in the art will appreciate any suitable communication protocol alternative may be utilized by the system 300 for data transmission.

Moving on, the collector 302 may also be comprised of an activation module 510. In an embodiment, the activation module 510 may activate and/or deactivate the supply of electricity traveling from the battery 502 to at least one of the microcontroller 504, the one or more sensors 506, the communication module 508, and the memory 512. More specifically, the activation module 510 may control the supply of electricity to the microcontroller 504 and/or the communication module 508. In embodiments where the microcontroller 504 is able to wirelessly communicate with various other components of the system 300, the activation module 510 may only control the supply of electricity to the microcontroller 504.

To illustrate, the activation module 510 may be toggled between the on state and/or the off state. For instance, the user may toggle the activation button 318 a first time, such that the activation module 510 may activate the supply of electricity from the battery 502 to the microcontroller 504, the one or more sensors 506, the communication module 508, and/or the memory 512 such that said components are operational in the on state. Whereas, the user may toggle the activation button 318 a second time, such that the activation module 510 may deactivate the supply of electricity to said components, thus rendering them nonoperational in the off state. However, in some embodiments, while in the off state, the activation module 510 may activate the supply of electricity from the battery 502 to one or more of the microcontroller 504, the one or more sensors 506, the communication module 508, and the memory 512, while deactivating/proscribing the supply of electricity from the battery 502 to the microcontroller 504 and/or the communication module 508.

Additionally, the activation module 510 may be toggled between the on state and the off state via one or more magnets. As a nonlimiting example, the activation module 510 may be a reed switch, such as a Littelfuse 59022-1-S-02-A. However, those having ordinary skill in the art will appreciate that other reed switches and/or reed switch alternatives may be utilized as the activation module 510. Moreover, the activation module 510 may be toggled between the on state and the off state with a wand 700 (described in more detail below). In an embodiment, once activated, the collector 302 may transmit physical property and/or location data at specific time intervals (e.g., every five minutes) for a first period of time (e.g., six hours). Subsequently, the collector 302 may scale down the time intervals in which it transmits data to preserve the battery 502.

As previously mentioned, the collector 302 may be further comprised of the memory 512. In an embodiment, the memory 512 may receive a supply of electricity from the battery 502 such that it is operational. Furthermore, the memory 512 may be communicatively coupled to at least one of the microcontroller 504 and the one or more sensors 506. As a nonlimiting example, the memory 512 may be comprised of an Electrically Erasable Programmable Read-Only Memory (EEPROM) chip.

In a further embodiment, the memory 512 may receive physical property and/or location data from the microcontroller 504, the one or more sensors 506, and/or the communication module 508. As a further nonlimiting example, the one or more sensors 506 may transmit physical property data directly to the memory 512. In yet another nonlimiting example, the one or more sensors 506 may first transmit physical property data to the microcontroller 504, which subsequently transmits the data to the memory 512.

Upon receipt of said data, the memory 512 may store it for future retrieval. In such an embodiment, the microcontroller 504 may retrieve the physical property data stored in the memory 512. To illustrate, the microcontroller 504 may retrieve physical property data stored in the memory 512 and transmit said data directly to the external database 516. Alternatively, the microcontroller 504 may retrieve the physical property data stored in the memory 512 and transmit said data to the communication module 508 which subsequently transmits it to the external database 516. In yet further alternatives, the microcontroller 504 may retrieve physical property data stored in the memory 512 and transmit said data to the data aggregator 514, wherein the aggregator 514 transmits the data to the external database 516.

In one embodiment, the collector 302 may be in constant communication with the one or more wireless networks 110 via the microcontroller 504 and/or the communication module 508. For example, the collector 302 may transmit a product's 518 physical property and/or location data to the external database 516, via the one or more wireless networks 110, throughout the entirety of the supply chain.

In another embodiment, the collector 302 may be in intermittent communication with the one or more wireless networks 110. To illustrate, during instances where the one or more networks 110 cannot be reached, the collector 302 may store the physical property and/or location data within the memory 512. Accordingly, said data may be later retrieved by the microcontroller 504 and subsequently transmitted to the external database 516 via at least one of the microcontroller 504, the communication module 508, and the data aggregator 514.

In yet a further embodiment, the collector 302 may adapt to varying network conditions, for example, connecting to a global satellite internet constellation when in remote areas, and later connecting to a standard Wi-Fi connection when in industrial or populated areas.

As mentioned above, the system 300 may be further comprised of the data aggregator 514. In an embodiment, the data aggregator 514 may be connected to a power source. For example, the power source may be the power supply of a motorized structure (e.g., a fishing vessel), and/or a separate battery pack.

In another embodiment, the data aggregator 514 may be enclosed within the wand 700. In such an embodiment, a wand battery 702 may supply electricity to the data aggregator 514, such that it is operational.

Furthermore, the data aggregator 514 may wirelessly communicate with the collector 302 and/or the external database 516. For instance, the collector 302 may transmit physical property data collected via the one or more sensors 506 to the data aggregator 514 via the microcontroller 504. In such an example, the collector 302 may not include the communication module 508, while the data aggregator 514 may include a cellular modem (e.g., Blues Notecard Cell+ WiFi or a Blues Notecard Cellular chip) capable of connecting to the one or more wireless networks 110. The microcontroller 504 may transmit the physical property data to the data aggregator 514 via any wireless communication technique known to those having ordinary skill in the art including, but not limited to, Bluetooth, LoRaWAN, the one or more wireless networks 110, Wi-Fi, Zigbee, etc. Subsequently, the data aggregator 514 may transmit the data to the external database 516 via any wireless communication technique known to those having ordinary skill in the art. Thus, the data aggregator 514 may serve as a gateway for physical property and/or location data between the collector 302 and the external database 516.

Moreover, the system 300 may be further comprised of the external database 516. As previously mentioned, the external database 516 may receive physical property and/or location data transmitted from the collector 302 via at least one of the microcontroller 504, the communication module 508 and/or the data aggregator 514. In an embodiment, the data may travel from the collector 302 and/or the data aggregator 514 via any wireless communication technique known to those having ordinary skill in the art (e.g., the one or more wireless networks 110).

In an embodiment, the physical property and/or location data collected from the product 518 may be transmitted to the external database 516, via any wireless communication technique known to those having ordinary skill in the art (e.g., the one or more wireless networks 110). As a nonlimiting example, subsequent to the collector 302 being inserted into the product 518 (e.g., a fish), the one or more sensors 506 may begin collecting physical property data. As collection of said data begins, the microcontroller 504 may subsequently initiate transmission of the physical property data to the data aggregator 514 and/or the external database 516 contemporaneously with the product's 518 movement through the supply chain.

In an alternative embodiment, the physical property data collected from the product 518 may be stored within the memory 512 such that said data may later be retrieved and transmitted to the data aggregator 514 and/or the external database 516. For instance, a user, while on a fishing boat, may not be able to access a reliable connection to the wireless network 110, via broadband satellite internet (e.g., Starlink®). Thus, the physical property data stored within the memory 512 may be retrieved by the microcontroller 504 and subsequently transmitted to the data aggregator 514 and/or the external database 516 over the wireless network 110 when said broadband satellite internet connection is more reliable.

Moreover, the external database 516 may be open-source. That is, the external database 516 may employ an open-source container orchestration system (e.g., Kubernetes, Docker, PostgreSQL, etc.). Additionally, the external database 516 may be cloud-based. Meaning, the external database 516 may employ one or more remote servers hosted by the internet. Accordingly, the external database 516 may store physical property and/or location data for future retrieval by users via the one or more client devices 102-106.

In an embodiment, the external database 516 may be a distributed ledger. As a nonlimiting example, the external database 516 may be a blockchain. In such an example, the physical property and/or location data transmitted to the external database 516 may become immutable. Meaning, said data may not be altered and/or manipulated, thus ensuring its' authenticity.

Furthermore, the external database 516 may enable validation of the physical property and/or location data, which in turn may create more efficient supply chain management standards. In an embodiment, the system 300 may utilize an oracle and/or a third-party digital notary, wherein said oracle is configured to connect the external database 516 to the wireless network 110.

Figure 12:
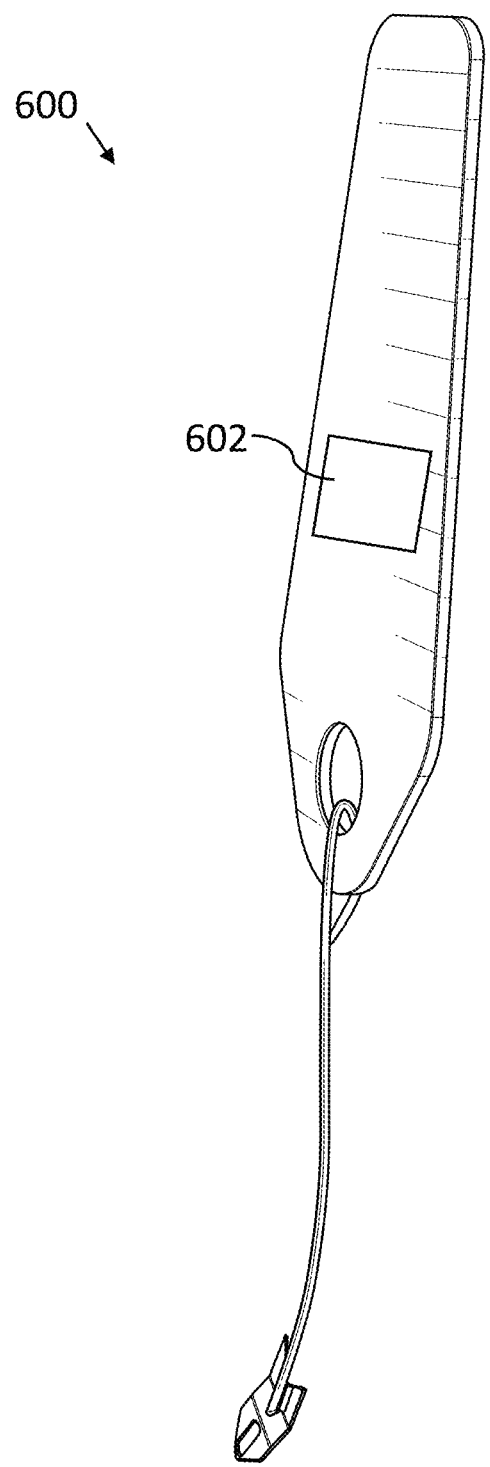
FIG. 12 illustrates an embodiment of a tag.

Turning to FIG. 12, the system 300 may be further comprised of a tag 600. In an embodiment, the tag 600 may be reversibly secured to the product 518. As a nonlimiting example, the tag 600 may be reversibly secured to the gill plate of a fish (as illustrated in FIG. 13). Furthermore, the tag 600 may travel with the product 518 as it moves through the supply chain.

Additionally, the tag 600 may wirelessly communicate with the collector 302. For example, the tag 600 may include a tag communication module (not depicted). As a nonlimiting example, the tag communication module may be comprised of at least one of an RFID tag and a Near-Field Communication (NFC) chip. More specifically, the tag communication module may be comprised of a NXP NTAG213 RFID tag.

In one embodiment, the tag 600 may be color coded depending upon the product 518 the tag 600 will be associated with. As a nonlimiting example, a red tag may be given to bluefin tuna, a yellow tag may be given to yellowtail, green tags may be given to swordfish, etc. Said color coded tags may be preloaded with RFID tags or NFC chips corresponding to the species of fish they will be placed upon.

Furthermore, the tag communication module may enable wireless communication between the tag 600 and the collector 302. To illustrate, the tag 600 may serve as a gateway between the physical property and/or location data, collected by the collector 302, and end consumers. In an embodiment, the tag 600 may include a scannable element 602. To illustrate, the scannable element 602 may include a QR printed barcode, RFID tag, or an NFC chip capable of being scanned by one or more of the client devices 102-106. In an exemplary embodiment, the QR printed barcode may be printed upon the tag 600 utilizing thermal transfer, which may render said QR code resistant to degradation via environmental factors (e.g., heat, water, wind, etc.).

In an embodiment, the scannable element 602 may establish a link between the collector 302 and the tag 600 attached to the product 518. For instance, the collector 302 may be assigned a unique identifier, which serves as a distinct code for tracking and managing physical property data and/or location data specific to that collector 302. Such a unique identifier may be encoded into the scannable element 602, which is then printed or affixed onto the tag 600 accompanying the product 518.

Thus, when the scannable element 602 is scanned using the one or more client devices 102-106 or a dedicated QR code reader, the encoded information is decoded to reveal the unique identifier of the collector 302. This identifier allows the scanning device to connect to the external database 516 where the physical property data and/or location data collected by the collector 302 is stored. Ultimately, users of the system 300 may access the physical property data and/or location data corresponding to the product 518, upon scanning the scannable element 602.

By linking the collector 302 to the tag 600 through the scannable element 602, users may easily verify the authenticity and freshness of the product 518. This system 300 enhances traceability and provides transparency to consumers and other parties involved, ensuring efficient data management and reliable access to product information throughout the supply chain.

Yet further, the tag 600 may travel with the product 518 through the entirety of the supply chain. In a nonlimiting example where the tag 600 is attached to a fish, the tag 600 and collector 302 may be removed from the fish once it is offloaded from a boat and transferred to a processing station. In such an example, the collector 302 may remain on the boat to be reused, whereas the tag 600 remains with the fish, thus enabling consumers to retrieve the physical property data and/or location data for the fish collected via the collector 302.

Figure 16:
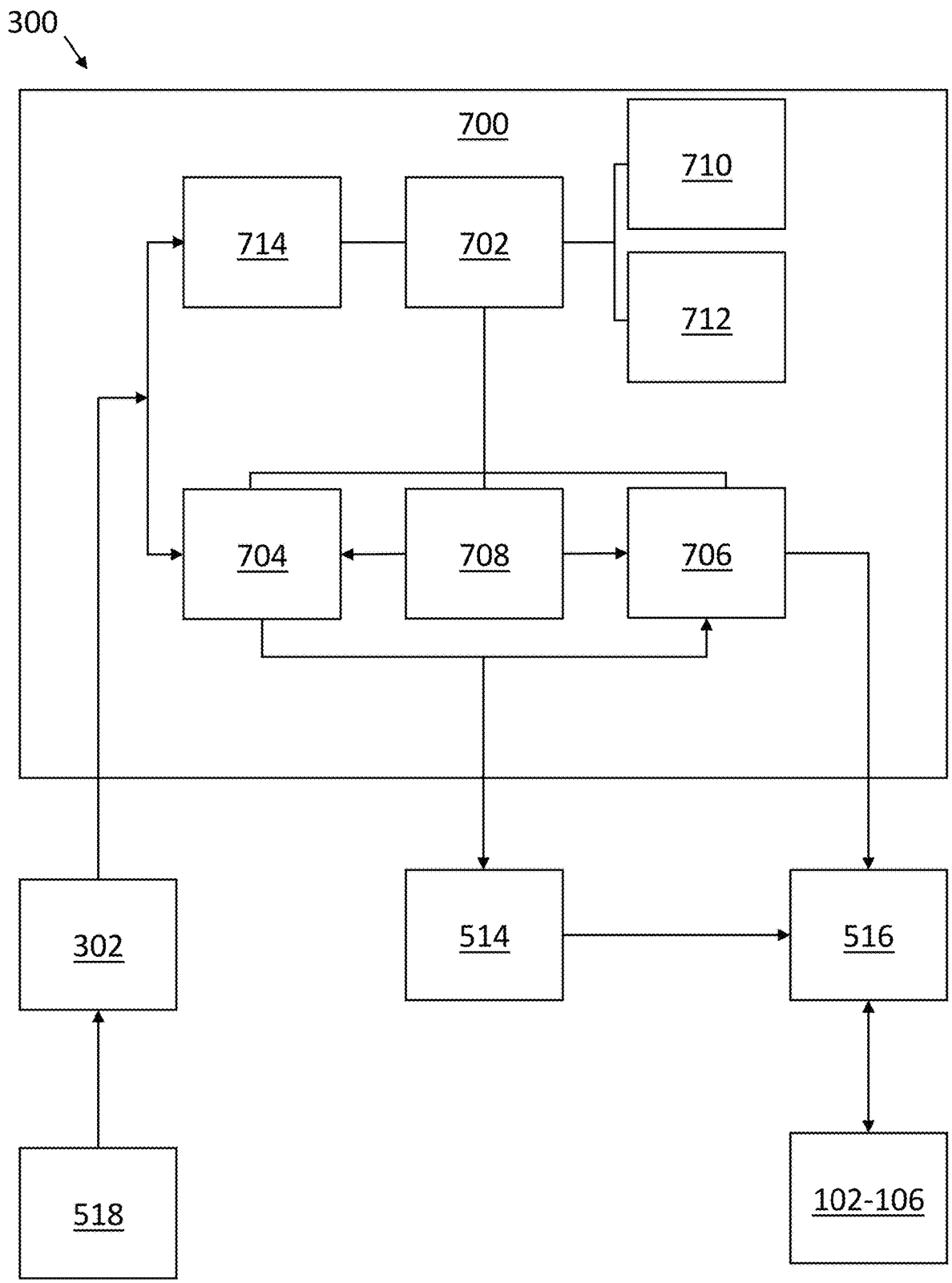
FIG. 16 illustrates an embodiment of a wand.

Moving on to FIG. 16, the lines without arrows may represent the movement of electricity, while lines with arrows may represent the flow of physical property data.

In an embodiment, the system 300 may be further comprised of the wand 700. For instance, the wand 700 may be further comprised of one or more internal components including a battery 702, a microcontroller 704, a communication module 706, a GPS module 708, an activation module 710, a reader 712, and/or a wand memory 714.

In an embodiment, the battery 702 may be in electrical communication with one or more of the microcontroller 704, communication module 706, GPS module 708, activation module 710, reader 712, and the wand memory 714. That is, the battery 702 may provide the microcontroller 704, communication module 706, GPS module 708, activation module 710, reader 712, and the wand memory 714 with a supply of electricity such that they are operational. Additionally, the battery 702 included within the wand 700 may be identical to the battery 502 included within the collector 302.

Moreover, the microcontroller 704 may, in addition to the battery 702, be in electrical communication with at least one of the communication module 706, GPS module 708, activation module 710, reader 712, and the wand memory 714. For instance, the microcontroller 704 may be comprised of a plurality of inputs and/or a plurality of outputs, wherein said inputs and/or outputs communicatively couple the microcontroller 704 to at least one of the communication module 706, GPS module 708, activation module 710, reader 712, and the wand memory 714. Said communicative coupling may enable the microcontroller 704 to receive and/or transmit data from/to at least one of the communication module 706, GPS module 708, activation module 710, reader 712, and the wand memory 714.

Additionally, the microcontroller 704 may enable the wand 700 to wirelessly communicate with various components of the system 300 (e.g., the collector 302, the one or more client devices 102-106, the data aggregator 514, and the external database 516). In such an embodiment, the microcontroller 704 may wirelessly communicate with said system 300 components via any wireless communication technique known to those having ordinary skill in the art including, but not limited to, Bluetooth, LoRaWAN, the one or more wireless networks 110, Wi-Fi, Zigbee, etc. For instance, the wand 700, via the microcontroller 704, may wirelessly communicate with the system's 300 components via integration with the satellite internet constellation (e.g., Starlink®) or another global network.

As a nonlimiting example, the microcontroller 704 may be an Espressif ESP32 chip, which incorporates a BLE module, thus enabling wireless communication between the microcontroller 704 and the system's 300 components.

Further, the microcontroller 704 may wirelessly communicate with the collector 302. For instance, the microcontroller 704 of the wand 700 may receive physical property data collected by the collector 302 via the microcontroller 504. As a nonlimiting example, the microcontroller 504 of the collector 302 may wirelessly transfer physical property data to the microcontroller 704 of the wand 700 via Bluetooth and/or Wi-Fi. Subsequent to the microcontroller's 704 receipt of said data, the microcontroller 704 may transmit the physical property data to the communication module 706, the data aggregator 514, and/or the external database 516.

As a further nonlimiting example, the microcontroller 504 of the collector 302 may wirelessly transfer physical property data to the data aggregator 514, incorporated within the wand 700 via Bluetooth and/or Wi-Fi. Subsequent to the data aggregator's 514 receipt of said data, the data aggregator 514 may transmit the physical property data to one or more of the wand microcontroller 704, the communication module 706, and/or the external database 516.

As previously mentioned, the microcontroller 704 may wirelessly communicate with the data aggregator 514. For instance, the microcontroller 704 may transmit physical property data collected by the collector 302 to the data aggregator 514. Subsequently, the data aggregator 514 may transmit the physical property data to the external database 516. Alternatively, the data aggregator 514 may transmit physical property data to the wand microcontroller 704, wherein said microcontroller 704 subsequently transmits the data to the external database 516.

Moreover, the wand 700 may be further comprised of the communication module 706. The communication module 706 may be in electrical communication with the battery 702, such that said module 706 is operational. Moreover, the communication module 706 may be in electrical communication with the microcontroller 704, such that the communication module 706 and microcontroller 704 are communicatively coupled.

The communication module 706 may enable wireless communication between the wand 700 and various components of the system 300. For instance, the wand 700, via the communication module 706, may wirelessly communicate with the system's 300 components via integration with the satellite internet constellation (e.g., Starlink®) or another global network.

In certain embodiments, the communication module 706 may wirelessly communicate with the external database 516 via any wireless communication technique known to those having ordinary skill in the art. In said embodiments, the communication module 706 may transmit physical property and/or location data to the external database 516. For example, the communication module 706 may be a Blues Notecard Cell+WiFi or a Blues Notecard Cellular chip. However, the communication module 706 may be any suitable wireless communication device alternative known to those having ordinary skill in the art.

Moreover, the communication module 706 may be communicatively coupled to the microcontroller 704. As a further nonlimiting example, the microcontroller 704 may transmit physical property data received from the collector 302, via its microcontroller 504, to the communication module 706 of the wand 700. In such an example, the communication module 706 may subsequently transmit the physical property data to the external database 516.

The wand 700 may be further comprised of the GPS module 708. The GPS module 708 may be in electrical communication with the battery 702 such that it is operational. Additionally, the GPS module 708 may be communicatively coupled to at least one of the microcontroller 704 and the communication module 706. As a nonlimiting example, the GPS module 708 may be a u-blox Neo-6M GPS Module. However, those having ordinary skill in the art will appreciate that any suitable location tracking device alternative may be employed as the GPS module 708.

In an embodiment, the GPS module 708 may collect location data and transmit said data to at least one of the microcontroller 704 and the communication module 706. For example, the GPS module 708 may collect location data and transmit said data to the microcontroller 704, wherein the microcontroller 704 transmits the data to the communication module 706, and wherein the communication module 706 ultimately transmits the data to the external database 516. Alternatively, the location data collected via the GPS module 708, may be transmitted directly to the communication module 706 and subsequently transmitted to the external database 516 over the one or more networks 110. In yet a further alternative, the GPS module 708 may collect location data and transmit it to the microcontroller 704, wherein the microcontroller 704 subsequently transmits it to the data aggregator 514, which ultimately transmits said data to the external database 516. In another embodiment, the GPS module 708 may collect location data and transmit it to the microcontroller 704, wherein the microcontroller 704 subsequently transmits it to the external database 516.

Furthermore, the location data may include the location where the collector 302 was initially activated (described in more detail below), as well as where the collector 302 was subsequently deactivated. That is, if a fish was caught in the Atlantic Ocean, the collector 302 may be inserted into said fish, and then activated via the activation module 710 of the wand 700. The location where the collector 302 was activated (i.e., the Atlantic Ocean), may be collected by the GPS module 708. Upon delivery of said fish to a port city (e.g., Boston, MA), the collector 302 may be deactivated by the wand 700, and the location of deactivation (i.e., the port city) may be collected by the GPS module 708. The location data may ultimately be transmitted to the external database 516 via the microcontroller 704 and/or the communication module 706 as described above.

Moving on, the wand 700 may be further comprised of the activation module 710. In an embodiment, the activation module 710 may be comprised of one or more magnets. In such an embodiment, the one or more magnets may toggle the activation module 510 of the collector 302 between the on and off states. As a nonlimiting example, the collector 302 may only remain in the on state, while the activation module 710 of the wand is in close proximity to the activation module 510 of the collector 302. Specifically, the collector 302 may only remain in the on state, while the one or more magnets of the activation module 710 are in proximity to magnetically communicate with the activation module 510 of the collector 302.

In certain embodiments, the wand 700 may be configured to activate the collector 302 via the activation module 710, wherein the wand 700 engages the activation module 510 of the collector 302. This remotely activated approach provides a waterproof power option and helps prevent accidental activation or deactivation by eliminating the need for a traditional button upon the collector 302.

The wand 700 may also be comprised of the reader 712. The reader 712 may be in electrical communication with the battery 702 such that it is operational. Furthermore, the reader 712 may be communicatively coupled to the microcontroller 704.

In an embodiment, the reader 712 may link the collector 302 to the tag 600. As a nonlimiting example, the reader 712 may be a PN532 NFC/RFID Module. For example, the wand 700 may establish a communicative link between the collector 302 and the tag 600 affixed to the product 518. In doing so, the wand 700 may synchronize physical property data and/or location data with a specific product identifier, enabling accurate tracking and subsequent retrieval of said data.

As previously mentioned, the wand 700 may be further comprised of the wand memory 714. In an embodiment, the wand memory 714 may receive a supply of electricity from the wand battery 702 such that it is operational. Furthermore, the wand memory 714 may be communicatively coupled to the wand microcontroller 704. As a nonlimiting example, the wand memory 714 may be comprised of an EEPROM chip.

In a further embodiment, the wand memory 714 may receive physical property and/or location data from the wand microcontroller 704 and/or the GPS module 708. As a further nonlimiting example, the collector 302, via the one or more sensors 506, may transmit physical property data directly to the wand memory 714. In yet another nonlimiting example, the collector 302, via the one or more sensors 506, may first transmit physical property data to the wand microcontroller 704, which subsequently transmits the data to the wand memory 714.

Upon receipt of said data, the wand memory 714 may store it for future retrieval. In such an embodiment, the wand microcontroller 704 may retrieve the physical property data stored in the wand memory 714. To illustrate, the wand microcontroller 704 may retrieve physical property data stored in the wand memory 714 and transmit said data directly to the external database 516. Alternatively, the wand microcontroller 704 may retrieve the physical property data stored in the wand memory 714 and transmit said data to the wand communication module 706 which subsequently transmits it to the external database 516. In yet further alternatives, the wand microcontroller 704 may retrieve physical property data stored in the wand memory 714 and transmit said data to the data aggregator 514, wherein the aggregator 514 transmits the data to the external database 516.

Moreover, the wand 700 may scan and extract physical property data and/or location data internally stored within the memory 512 of the collector 302. Said data may subsequently be transmitted to the external database 516, ensuring timely updates for monitoring and analysis. In one embodiment, the wand 700 may be a handheld device.

As mentioned above, the external database 516 may be made accessible to one or more users via the one or more client devices 102-106. Specifically, the external database 516 may be accessed by the one or more client devices 102-106 via the one or more wireless networks 110.

In an embodiment, the external database 516 may be accessed through an application, thus allowing users to access said database 516 through the one or more client devices 102-106. Specifically, the application may be a mobile application and/or a web-based application. In embodiments where the application is a mobile application, users may download said application at a mobile application store (e.g., App Store, Google Play Store, etc.).

Furthermore, users may view and/or retrieve physical property and location data stored in the external database 516. In some embodiments, users may view and/or retrieve physical property and location data for a particular product 518 contemporaneously with said product's 518 movement through the supply chain. As a nonlimiting example, users may view and/or retrieve the physical property and location data of a recently caught fish as the collector 302 transmits said data to the external database 516. Alternatively, users may view and/or retrieve the physical property and location data of the product 518 at the end of the supply chain.

Moreover, the external database 516 may be accessed through the one or more client devices 102-106 upon interaction with the tag 600. Specifically, users may scan the scannable element 602 placed upon the tag 600 with the one or more client devices 102-106, wherein upon scanning said scannable element 602, users are directed to the external database 516. In another embodiment, the scannable element 602 may be created after the product 518 has travelled through the supply chain. For example, a fish being offered for sale at a grocery store, may be accompanied by the scannable element 602 disposed upon said fish's packaging, thus enabling users to access the external database with the one or more client devices 102-106.

In yet a further embodiment, the system 300 may enable user participation in an auction of the product 518. For instance, the auction may be hosted on the external database 516. As a nonlimiting example, the auction may be a Dutch auction.

Additionally, the auction may occur contemporaneously with the shipment of the product 518, enabling users may bid on the product 518 as it travels through the supply chain. In yet another nonlimiting example, users may bid on a fish based upon its product freshness score as said fish travels through the supply chain, wherein a winner of the auction may be determined via a smart contract.

In an embodiment, the external database 516 may be a distributed ledger, such as a blockchain. To illustrate, the external database 516 may record the physical property data and/or location data (collectively, the "data") across multiple computers in such a way that the registered data cannot be altered retroactively. This ensures the security and integrity of said data.

Furthermore, the external database 516 may operate by grouping data into blocks. To illustrate, each block contains a cryptographic hash of the previous block, a timestamp, and transaction data. The cryptographic hash may function as a unique identifier for each block, linking it to the previous block and forming a chain. This chain of blocks may subsequently be distributed across a network of nodes, each maintaining a copy of the entire blockchain.

When new data, such as the physical property data and/or location data from the collector 302, is added to the external database 516, it may first be verified by the network nodes through a consensus mechanism. As a nonlimiting example, the consensus mechanism may include, Proof of Work (PoW) and/or Proof of Stake (PoS), thus ensuring that all nodes agree on the validity of the new block before it is added to the chain.

Moreover, once consensus has been reached, the new block may be added to the external database 516, and the updated external database 516 may be distributed to all nodes in the network. Such a decentralized approach may ensure that the physical property data and/or location data is immutable and tamper-proof, as altering any block would require changing all subsequent blocks and gaining control of the majority of the network, which is computationally infeasible.

Furthermore, the external database's 516 distributed nature may enhance security and reliability, as there is no single point of failure. This makes it an ideal solution for maintaining the integrity of data in the supply chain, ensuring that all consumers have access to accurate and verified information.

Furthermore, as previously mentioned, the external database 516 may be a blockchain. To illustrate, each collector 302 comprising the system 300 may be linked with a corresponding tag 600. That is, the tag communication module may enable wireless communication between the tag 600 and the collector 302 to serve as a gateway between the physical property and/or location data, collected by the collector 302, and end consumers. Thus, the scannable element 602 disposed upon the tag 600 may serve as a unique identifier for both the tag 600 and the collector 302. The unique identifier may be linked to the blockchain.

Moreover, the physical property and/or location data collected by the collector 302 and/or the wand 700 may be uploaded to a block. For instance, once activated by the wand 700, the collector 302 may transmit physical property and/or location data at specific time intervals (e.g., every five minutes). At every time interval, the collector 302 collects physical property and/or location data, which is ultimately transmitted to the external database 516. That is, for each time interval the physical property and/or location data is created, a new block may also be created. Each block, comprised of the physical property and/or location data, may be linked to one another via cryptographic hashes. Thus, the physical property and/or location data becomes immutable, rendering it alteration/manipulation proof, which ultimately ensures its' authenticity.

The external database 516 may be managed by a P2P computer network.

Furthermore, the system 300 may comprise an automated physical property data collector 302 or an alternative physical property data collector 400, which include: a collector battery 502, a collector microcontroller 504 in electrical communication with the collector battery 502, and one or more collector sensors 506 in electrical communication with the collector battery 502 and communicatively coupled to the collector microcontroller 504. The system 300 may be further comprised of one or more wireless networks 110, and an external database 516 in wireless communication with the collectors 302/400 via the one or more wireless networks 110. Moreover, the collector microcontroller 504 having stored therein machine executable instructions, that when executed by the collector microcontroller 504r, cause the collectors 302/400 to: collect, via the one or more collector sensors 506, physical property data from a product 518; and transmit, over the one or more wireless networks 110, the physical property data from the automated physical property data collectors 302/400 to the external database 516, wherein the transmitted physical property data being stored in the external database 516 and made accessible to a user via one or more client devices 102-106.

The system 300 may be further comprised of a data aggregator 514 in wireless communication with the automated physical property data collectors 302/400 and the external database 516.

In an embodiment, the one or more collector sensors 506 transmit the physical property data to the collector microcontroller 504, and the collector microcontroller 504 transmits the physical property data to the data aggregator 514. The data aggregator 514 then transmits the physical property data to the external database 516. Alternatively, the one or more collector sensors 506 transmit the physical property data to the collector microcontroller 504, the collector microcontroller 504 transmits the physical property data to the data aggregator 514 incorporated within the wand 700. The data aggregator 514 then transmits the physical property data to the wand microcontroller 704, wherein said microcontroller 704 ultimately transmits the physical property data to the external database 516.

In another embodiment, the automated physical property data collectors 302/400 are further comprised of a collector communication module 508, in electrical communication with the collector battery 502, communicatively coupled to the collector microcontroller 504, and in wireless communication with the external database 516 via the one or more wireless networks 110.

Further, the machine executable instructions, when executed by the collector microcontroller 504, further cause the automated physical property data collectors 302/400 to: collect, via the collector communication module 508, location data from the product. The one or more collector sensors 506 transmit the physical property data to the collector microcontroller 504, the collector microcontroller 504 transmits the physical property data to the collector communication module 508, and the collector communication module 508 collects the location data and transmits the physical property data and the location data to the external database 516. The external database 516 may be a blockchain.

In an embodiment, the system 300 may be further comprised of a tag 600 in wireless communication with the automated physical property data collectors 302/400. The tag 600 being comprised of a scannable element 602. Upon scanning the scannable element 602 with the one or more client devices 102-106, the user may access the physical property data for the product 518 stored within the external database 516.

In yet a further embodiment, the system 300 may be further comprised of a wand 700 including a wand battery 702; and a wand microcontroller 704 in electrical communication with the wand battery 702. The wand microcontroller 704 wirelessly communicates with the collector microcontroller 504, such that the collector microcontroller 504 is able to transmit physical property data from the automated physical property data collectors 302/400 to the wand 700.

As mentioned above, the wand 700 may be further comprised of the data aggregator 514. For instance, the data aggregator 514 may be in electrical communication with the wand battery 702 and communicatively coupled to the wand microcontroller 704. That is, the physical property data and/or location data may be transmitted from the collector 302 to the data aggregator 514 within the wand 700.

Subsequently, said data may be transmitted from the data aggregator 514 to the wand microcontroller 704, and ultimately from the wand microcontroller 704 to the external database 516.

Additionally, the one or more collector sensors 506 transmit the physical property data to the collector microcontroller 504, the collector microcontroller 504 transmits the physical property data to the wand microcontroller 704, the wand microcontroller 704 transmits the physical property data to a data aggregator 514, and the data aggregator 514 transmits the physical property data to the external database 516.

Alternatively, the one or more collector sensors 506 transmit the physical property data to the collector microcontroller 504, the collector microcontroller 504 transmits the physical property data to the data aggregator 514, the data aggregator 514 transmits the physical property data to the wand microcontroller 704, and the wand microcontroller 704 transmits the physical property data to the external database 516.

In another embodiment, the wand 700 may be further comprised of a wand communication module 706, in electrical communication with the wand battery 702, communicatively coupled to the wand microcontroller 704 and/or data aggregator 514, and in wireless communication with the external database 516 via the one or more wireless networks 110.

The wand 700 may be further comprised of a wand GPS module 708 able to collect product location data, the wand GPS module 708: in electrical communication with the wand battery 702 and communicatively coupled to at least one of the wand microcontroller 704 and the wand communication module 706.

The one or more collector sensors 506 transmit the physical property data to the collector microcontroller 504, the collector microcontroller 504 transmits the physical property data to the data aggregator 514, the data aggregator 514 transmits the physical property data to the wand microcontroller 704, the wand microcontroller 704 transmits the physical property data to the wand communication module 706, the wand GPS module 708 transmits the product location data to the wand communication module 706, and the wand communication module 706 transmits the physical property data and the product location data to the external database 516.

Figure 17:
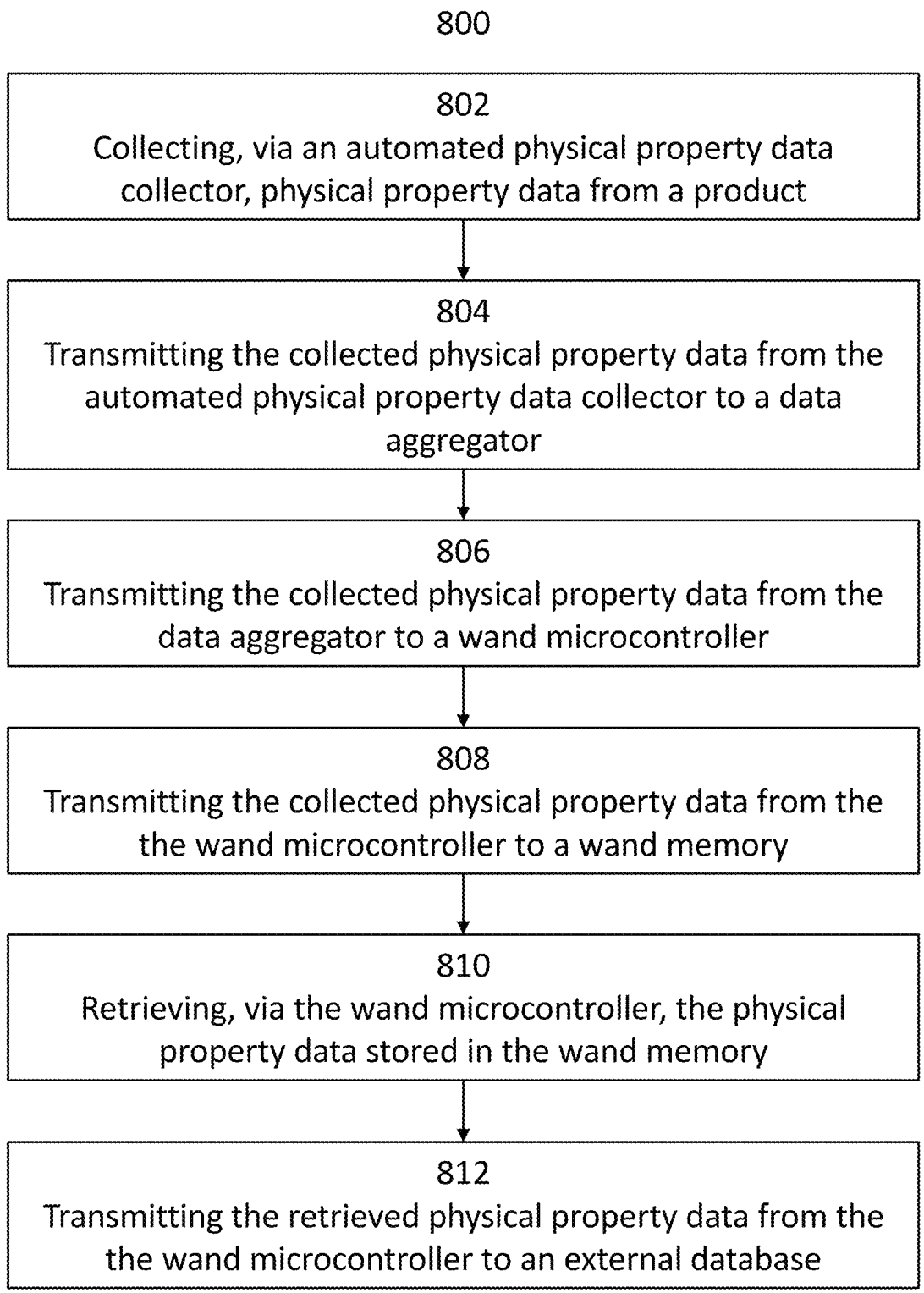
FIG. 17 illustrates a method for contemporaneously measuring and securely transmitting product physical property data.

Yet further, as illustrated in FIG. 17, the present disclosure may be further directed to a method for contemporaneously measuring and securely transmitting product physical property data (the "method") 800. The method 800 may incorporate the components of the system 300 as described above.

In a first step 802 of the method 800, an automated physical property data collector 302/400 may collect physical property data from a product 518. In one embodiment, the automated physical property data collector 302/400 may include: a collector battery 502, a collector microcontroller 504 in electrical communication with the collector battery 502, and one or more collector sensors 506 in electrical communication with the collector battery 502 and communicatively coupled to the collector microcontroller 504. In a further embodiment, the automated physical property data collector 302/400 of the method 800 may be the same as that described above.

Further, the physical property data may be collected via the one or more sensors 506 of the collector 302/400.

In a second step 804, the physical property data collected by the automated physical property data collector 302/400 may be transmitted to a data aggregator 514. Specifically, the physical property data collected by the one or more sensors 506 may be transmitted to the collector microcontroller 504, wherein said microcontroller 504 subsequently transmits the data to the data aggregator 514. In an embodiment, the data aggregator 514 may be enclosed within a wand 700.

The method 800 may be further comprised of a third step 806, wherein the physical property data is transmitted from the data aggregator 514 to the wand 700. In particular, the physical property data may be transmitted from the data aggregator 514 to a wand microcontroller 704 enclosed within the wand 700. In one embodiment, the data aggregator 514 may be incorporated into the wand 700. In an alternative embodiment, the data aggregator 514 may be a separate component, external to the wand 700.

As a nonlimiting example, the transmission of data from the data aggregator 514 to the wand microcontroller 704 may not be instant. Indeed, upon the data aggregator's 514 receipt of the physical property data in the second step 804, said data may remain in the aggregator 514 for a period of time prior to transmission to the wand microcontroller 704.

In a fourth step 808, the physical property data may be transmitted from the wand microcontroller 704 to the wand memory 714. In such a step 808, the wand memory 714 may store the physical property data for later retrieval.

The method 800 may be further comprised of a fifth step 810. During such step 810, the wand microcontroller 704 may retrieve the physical property data from the wand memory 714.

Subsequently, the wand microcontroller 704, in a sixth step 812 of the method 800, may transmit the physical property data, via the one or more wireless networks 110, to the external database 516.

As a nonlimiting example, the physical property data may be retrieved from a product via the physical property data collector, wherein the physical property data may be stored in a memory unit aboard the collector. In such a nonlimiting example, the physical property data may be later transmitted to the wand from the memory unit aboard the physical property data collector, wherein the wand comprises a data aggregator, a wand microcontroller, and/or a wand memory. Thus, the physical property data may be stored within the wand's memory for later transmissions to the external database. The physical property data may include the temperature, time of temperature reading, and location of temperature reading, wherein such metrics are determined via the collector. In another embodiment, the time of temperature reading and location of temperature reading may be determined by the wand. In such an instance, the time of temperature reading and location of temperature reading may be retrieved upon syncing the wand with the collector.

In one embodiment, the external database 516 is a blockchain.

Further, the one or more collector sensors 506 collect the physical property data and transmit the physical property data to the collector microcontroller 504, and the collector microcontroller 504 transmits the physical property data to a data aggregator 514. In such an embodiment, the data aggregator 514 may be incorporated within the wand 700, wherein said aggregator 514 subsequently transmits the physical property data to the wand microcontroller 704. Ultimately, the physical property data may be transmitted from the wand microcontroller 704 to the external database 516.

Moreover, the data aggregator 514 transmits the physical property data to the external database 516.

Additionally, the system 300 may be comprised of an automated physical property data collector. In an embodiment, such a collector may include at least one of a component housing, and a probe. As a nonlimiting example, the probe may be configured to pierce and reversibly affix to a product.

The automated physical property data collector may be further comprised of one or more sensors disposed within the probe, wherein the one or more sensors may be configured to retrieve temperature data from the product.

Furthermore, the automated physical property data collector may also include, a microcontroller and a communication module disposed within the component housing. In an embodiment, the microcontroller may be in informatic communication with the one or more sensors, and the communication module, and the communication module may be configured to retrieve location data of the product. As a nonlimiting example, the one or more sensors and the communication module may be configured to retrieve the temperature data and the location data, respectively, at one or more temporal instances. As a further nonlimiting example, the communication module may be in wireless communication with an external database configured to store the temperature data and the location data of the product for each of the one or more temporal instances.

EXAMPLES

The following Examples demonstrate nonlimiting embodiments of the system and method provided in the instant disclosure.

Example 1. A system for contemporaneously measuring and securely transmitting physical property data of a product, the system comprising:
an automated physical property data collector including:
a collector battery,
a collector microcontroller in electrical communication with the collector battery, and
one or more collector sensors in electrical communication with the collector battery and communicatively coupled to the collector microcontroller; and
an external database in wireless communication with the automated physical property data collector;
the collector microcontroller having stored therein machine executable instructions, that when executed by the collector microcontroller, cause the automated physical property data collector to: collect, via the one or more collector sensors, the physical property data from the product; and transmit, the physical property data from the automated physical property data collector to the external database,
the transmitted physical property data being stored in the external database and made accessible to a user via one or more client devices.

Example 2. The system of Example 1, further comprising a data aggregator in wireless communication with the automated physical property data collector and the external database.

Example 3. The system of Example 2, wherein the collector microcontroller transmits the physical property data to the data aggregator.

Example 4. The system of Example 3, wherein the data aggregator transmits the physical property data to the external database.

Example 5. The system of Example 1, wherein the automated physical property data collector is further comprised of a collector communication module, the collector communication module:

in electrical communication with the collector battery,
communicatively coupled to the collector microcontroller, and
in wireless communication with the external database.

Example 6. The system of Example 5, wherein the machine executable instructions, when executed by the collector microcontroller, further cause the automated physical property data collector to:
collect, via the collector communication module, location data from the product.

Example 7. The system of Example 6, wherein
the collector microcontroller transmits the physical property data to the collector communication module, and
the collector communication module transmits the physical property data and the location data to the external database.

Example 8. The system of Example 1, further comprising:
a tag coupled to the automated physical property data collector, via a scannable element.

Example 9. The system of Example 8, wherein upon scanning the scannable element with the one or more client devices, the user may access the physical property data for the product stored within the external database.

Example 10. The system of Example of 1, further comprising a wand including:
a wand battery; and
a wand microcontroller in electrical communication with the wand battery.

Example 11. The system of Example 10, wherein the wand microcontroller is configured to wirelessly communicates with the collector microcontroller, such that the collector microcontroller is able to transmit physical property data from the automated physical property data collector to the wand.

Example 12. The system of Example 11, wherein
the collector microcontroller transmits the physical property data to a data aggregator,
the data aggregator transmits the physical property data to the wand microcontroller, and
the wand microcontroller transmits the physical property data to the external database.

Example 13. The system of Example 11, wherein the wand is further comprised of:
a wand communication module,
in electrical communication with the wand battery,
communicatively coupled to the wand microcontroller, and
in wireless communication with the external database.

Example 14. The system of Example of 13, wherein the wand is further comprised of:
a wand GPS module able to collect product location data, the wand GPS module:
in electrical communication with the wand battery, and
communicatively coupled to at least one of the wand microcontroller and the wand communication module.

Example 15. The system of Example of 14, wherein
the collector microcontroller transmits the physical property data to the wand microcontroller, the wand microcontroller transmits the physical property data to the wand communication module, the wand GPS module transmits the product location data to the wand communication module, and
the wand communication module transmits the physical property data and the product location data to the external database.

Example 16. A method for contemporaneously measuring and securely transmitting product physical property data, the method comprising:
    collecting, via an automated physical property data collector, physical property data from a product,
    the automated physical property data collector including:
    a collector battery,
    a collector microcontroller in electrical communication with the collector battery, and
    one or more collector sensors in electrical communication with the collector battery and communicatively coupled to the collector microcontroller;
    transmitting, via one or more wireless networks, the physical property data from the automated physical property data collector to an external database;
    storing, the physical property data within the external database; and
    enabling, via one or more client devices, a user to access the physical property data stored within the external database.

Example 17. The method of Example 16, wherein the external database is a blockchain.

Example 18. The method of Example 16, wherein the one or more collector sensors collect the physical property data and transmit the physical property data to the collector microcontroller, and the collector microcontroller transmits the physical property data to a data aggregator.

Example 19. The method of Example 18, wherein the data aggregator transmits the physical property data to the external database.

Example 20. A system for tracking physical property data of a product, the system comprising:
    an automated physical property data collector including:
    a component housing;
    a probe,
    the probe configured to pierce and reversibly affix to the product;
    one or more sensors disposed within the probe,
    the one or more sensors configured to retrieve temperature data from the product;
    a microcontroller disposed within the component housing; and
    a communication module disposed within the component housing,
    the microcontroller in informatic communication with the one or more sensors, and the communication module,
    the communication module configured to retrieve location data of the product,
    wherein the one or more sensors and the communication module are configured to retrieve the temperature data and the location data, respectively, at one or more temporal instances, and
    the communication module in wireless communication with an external database configured to store the temperature data and the location data of the product for each of the one or more temporal instances.

Finally, other implementations of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

Various elements, which are described herein in the context of one or more embodiments, may be provided separately or in any suitable subcombination. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

All references, patents and patent applications and publications that are cited or referred to in this application are incorporated in their entirety herein by reference. Finally, other implementations of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A system for measuring and securely transmitting physical property data of a product, the system comprising:
    an automated physical property data collector including:
        a collector microcontroller, and
        one or more collector sensors communicatively coupled to the collector microcontroller;
    an external database in wireless communication with the automated physical property data collector; and
    a wand including:
        a wand microcontroller,
            the wand microcontroller configured to wirelessly communicate with the collector microcontroller, such that the collector microcontroller is able to transmit the physical property data from the automated physical property data collector to the wand;
        the collector microcontroller having stored therein machine executable instructions, that when executed by the collector microcontroller, cause the automated physical property data collector to:
            collect, via the one or more collector sensors, the physical property data from the product; and
            transmit, the physical property data from the automated physical property data collector to the external database,
                the transmitted physical property data being stored in the external database and made accessible to a user via one or more client devices.

2. The system of claim 1, further comprising a data aggregator in wireless communication with the automated physical property data collector and the external database.

3. The system of claim 2, wherein the collector microcontroller transmits the physical property data to the data aggregator.

4. The system of claim 3, wherein the data aggregator transmits the physical property data to the external database.

5. The system of claim 1, wherein the automated physical property data collector is further comprised of a collector communication module, the collector communication module:
    communicatively coupled to the collector microcontroller, and
    in wireless communication with the external database.

6. The system of claim 5, wherein the machine executable instructions, when executed by the collector microcontroller, further cause the automated physical property data collector to:
   collect, via the collector communication module, location data from the product.

7. The system of claim 6, wherein
   the collector microcontroller transmits the physical property data to the collector communication module, and
   the collector communication module transmits the physical property data and the location data to the external database.

8. The system of claim 1, further comprising:
   a tag coupled to the automated physical property data collector, via a scannable element.

9. The system of claim 8, wherein upon scanning the scannable element with the one or more client devices, the user may access the physical property data for the product stored within the external database.

10. The system of claim 1, wherein
    the collector microcontroller transmits the physical property data to a data aggregator,
    the data aggregator transmits the physical property data to the wand microcontroller, and
    the wand microcontroller transmits the physical property data to the external database.

11. The system of claim 1, wherein the wand is further comprised of:
    a wand communication module,
       communicatively coupled to the wand microcontroller, and
       in wireless communication with the external database.

12. The system of claim of 11, wherein the wand is further comprised of:
    a wand GPS module able to collect product location data, the wand GPS module:
       communicatively coupled to at least one of the wand microcontroller and the wand communication module.

13. The system of claim of 12, wherein
    the collector microcontroller transmits the physical property data to the wand microcontroller,
    the wand microcontroller transmits the physical property data to the wand communication module,
    the wand GPS module transmits the product location data to the wand communication module, and
    the wand communication module transmits the physical property data and the product location data to the external database.

* * * * *